United States Patent
Kunze

(10) Patent No.: US 10,521,882 B2
(45) Date of Patent: Dec. 31, 2019

(54) DETERMINATION OF BRIGHTNESS VALUES OF VIRTUAL PIXELS

(71) Applicant: BASLER AG, Ahrensburg (DE)

(72) Inventor: Jörg Kunze, Ahrensburg (DE)

(73) Assignee: BASLER AG, Ahrensburg (DE)

(*) Notice: Subject to any disclaimer, the term of this patent is extended or adjusted under 35 U.S.C. 154(b) by 0 days.

(21) Appl. No.: 15/737,785

(22) PCT Filed: Dec. 1, 2016

(86) PCT No.: PCT/EP2016/079463
§ 371 (c)(1),
(2) Date: Dec. 19, 2017

(87) PCT Pub. No.: WO2017/102361
PCT Pub. Date: Jun. 22, 2017

(65) Prior Publication Data
US 2019/0005617 A1    Jan. 3, 2019

(30) Foreign Application Priority Data

Dec. 15, 2015   (DE) ................ 10 2015 121 823
Jul. 14, 2016   (DE) ................ 10 2016 113 010

(51) Int. Cl.
*G06T 3/40*       (2006.01)
*G06T 5/00*       (2006.01)
*G06T 5/20*       (2006.01)

(52) U.S. Cl.
CPC ............ *G06T 3/4007* (2013.01); *G06T 3/40* (2013.01); *G06T 5/008* (2013.01); *G06T 5/20* (2013.01);
(Continued)

(58) Field of Classification Search
CPC ......... G06T 3/4007; G06T 3/40; G06T 5/008; G06T 5/20; G06T 2207/20012; G06T 2207/20092; G06K 7/10722; H04N 5/3454
(Continued)

(56) References Cited

U.S. PATENT DOCUMENTS 6,295,087 B1 * 9/2001 Nohda .............. H04N 9/045
                                                 348/234
6,462,779 B1   10/2002 Philbrick
(Continued)

FOREIGN PATENT DOCUMENTS

EP    0532221    3/1993
EP    0710925    5/1996
(Continued)

*Primary Examiner* — Ali Bayat
(74) *Attorney, Agent, or Firm* — Price Heneveld LLP

(57) ABSTRACT

The invention relates to an image processing apparatus for processing image data of an image sensor with a regular arrangement of first pixels, wherein the image processing apparatus is configured to determine a brightness value for each of two or more virtual second pixels of the same size at different intermediate positions between the first pixels, wherein the determination of the respective brightness value comprises an interpolation of the pixels of a neighborhood of the respective intermediate position, by means of a local filter, wherein each of the local filters comprises a plurality of filter coefficients, wherein for at least one of the local filters more than one of the filter coefficients is unequal to zero, and wherein the sum of the squared filter coefficients for each of the local filters is equal to a constant value, which according to a first condition is the same for all local filters.

15 Claims, 12 Drawing Sheets

(52) U.S. Cl.
CPC ............... *G06T 2207/20012* (2013.01); *G06T 2207/20092* (2013.01)

(58) Field of Classification Search
USPC ........................................................ 382/272
See application file for complete search history.

(56) References Cited

U.S. PATENT DOCUMENTS

| | | | |
|---|---|---|---|
| 7,286,721 B2 | 10/2007 | Huang et al. | |
| 7,567,723 B2 | 7/2009 | Sakakima | |
| 7,680,359 B2 * | 3/2010 | Castorina | .................. G06T 5/50 382/284 |
| 2002/0093510 A1 * | 7/2002 | Abe | ...................... G06T 3/4007 345/589 |
| 2002/0101525 A1 * | 8/2002 | Abe | ...................... G06T 3/4007 348/273 |
| 2004/0179747 A1 * | 9/2004 | Matsumoto | ........... G06T 3/4007 382/261 |
| 2010/0315536 A1 * | 12/2010 | Wang | ........................ G06K 7/14 348/239 |
| 2012/0002066 A1 * | 1/2012 | Wang | ..................... H04N 5/345 348/222.1 |
| 2013/0156346 A1 * | 6/2013 | Lee | ....................... G06T 3/4007 382/300 |
| 2015/0207974 A1 * | 7/2015 | Mody | .................... H04N 5/345 348/296 |

FOREIGN PATENT DOCUMENTS

| | | |
|---|---|---|
| EP | 0940029 | 9/1999 |
| EP | 0969443 | 1/2000 |
| WO | 9728641 | 8/1997 |

* cited by examiner

DETERMINATION OF BRIGHTNESS VALUES OF VIRTUAL PIXELS

CROSS-REFERENCE TO FOREIGN PRIORITY APPLICATIONS

The present application claims the benefit under 35 U.S.C. § 119(b) of PCT/EP2016/079463 filed Dec. 1, 2016, which claims priority to German Application No. 102015121823.2 dated Dec. 15, 2015, and German Application No. 102016113010.9 dated Jul. 14, 2016.

FIELD OF THE INVENTION

The invention relates to an image processing apparatus for processing image data of an image sensor with a regular arrangement of first pixels, as well as to a digital camera, which comprises an image sensor and the image processing apparatus. The invention further relates to a corresponding image processing method as well as a computer apparatus and a computer program product.

BACKGROUND OF THE INVENTION

In the industrial field and in related fields of application, such as travel surveillance and medical technology, there exists a plurality of different applications of digital cameras, which mostly differ with respect to the requirements concerning the cameras. For instance, predominantly in the field of travel surveillance cameras, there is need for a high horizontal resolution, which facilitates the reading of license plates on a respective number of travel lanes. In the automatic inspection of, e.g., brake disks, on the other hand, a different resolution is required, which facilitates the inspection of specific check gauges with a pre-determined precision.

FIG. 1 shows schematically and exemplarily the structure of a digital camera 10 with a lens 22. A scene 30 is projected via the lens 22 onto an image sensor 31, which comprises a regular arrangement of light-sensitive elements, so-called pixels. The image sensor 31 conveys electronic data to a processing unit 32, which usually is located in the camera 10 and which, e.g., comprises a processor, a digital signal processor (DSP), or a so-called field programmable gate array (FPGA). It can thereby be necessary to convert analog image data into digital image data, e.g., by means of an analog-to-digital converter (not shown in the figure). Where applicable, further desired mathematical operations, e.g., a color correction or a conversion into another image format, are executed on the image data in the processing unit 32 before the data are subsequently output as an electronic signal 34 via an interface 33.

The above-mentioned different requirements concerning digital cameras are usually addressed by the camera manufacturers with a large number of different camera models. Providing such a large number of camera variants requires a high organizational and financial effort, e.g., in the development, the production, the marketing, the distribution, and the logistic. It would, therefore, be desirable to be able to reduce the variety of camera variants or of the hard and software modules from which they are assembled.

If one has a closer look at the formation of the variants of digital cameras, it can be seen that, in particular, the large number of the different required types of image sensors inflates the variety of the variants. It would, therefore, be desirable to be able to fulfill the different requirements concerning digital cameras with fewer types of image sensors. Particularly important distinguishing features in this context are the size and the number of pixels of an image sensor, wherein the physical size of the sensor or of its diagonal, respectively, results from these characteristics as further important distinguishing features.

Starting from the above-described situation regarding the variety of digital camera variants, the present inventor has considered it an object to develop a means to generate, from an image of an image sensor with a first pixel size, an image with a second pixel size, which preferably is freely selectable and differs from the first pixel size, without the need of using a different image sensor type with the second pixel size. In this way, more than one application with more than one requirement concerning the pixel size and number could be addressed with the same camera hardware with the same image sensor type. This may allow to save at least part of the costs for the forming of the different variants and/or to reduce the respective organizational effort.

PRIOR ART

A known method for generating in an image sensor with a first pixel size an image with a second pixel size is known as "binning", wherein usually a distinction is made between (1) charge domain binning, (2) voltage domain binning, and (3) digital domain binning. The first case comprises the combining of charge packets of neighboring pixels or pixels that are arranged in spatial proximity, the second case combines voltage signals and the third case combines digital signals, whereby a charge, voltage or digital value is obtained, which represents the signal of a so-called "superpixel" with a second pixel size. Such binning methods are described in detail, e.g., in the European patent document EP 0 940 029 or in the US patent document U.S. Pat. No. 6,462,779.

FIG. 2 shows schematically and exemplarily different binning processes. FIG. 2(a) shows an image sensor with a regular arrangement of pixels 40 with a first pixel size. FIG. 2(b) shows an arrangement of superpixels 41, which were generated by binning horizontally neighboring pixels, that are twice as wide and have the same height as the pixels 40. In the literature, such a binning is called a 2×1 binning. FIG. 2(c) shows an arrangement of superpixels 42, which were generated by binning horizontally and vertically neighboring pixels, that are twice as high and twice as wide as the pixels 40. In the literature, such a binning is called a 2×2 binning. The visible spaces between the superpixels 41 in FIGS. 2(a) to (c) only serve to make their outlines more easily recognizable and are not present in reality.

Generally, binning can be used to generate superpixels with sides lengths that are an integer multiple of the side lengths of the first pixels, respectively. It is, however, possible that a second pixel size is desired with side lengths that are not an integer, e.g., a rational, multiple of the side lengths of the first pixels. Such an aspect ratio cannot be realized by means of binning methods so far.

An example for a non-integer, rational multiple of the side lengths of the second pixels relative to the side lengths of the first pixels is schematically and exemplarily shown in FIG. 3. There, the second pixels 44 have side lengths of ⅗ of the side lengths of the first pixels 43. Also in this case, the visible spaces between the second pixels 44 are not present in reality and only serve to make their outlines more easily recognizable.

A further disadvantage of charge domain binning is that it can only be realized in such image sensors, in which this is possible due to their design, e.g., in a number of CCD sensors, but not in image sensors in which it is not possible due to the design, e.g., in various CMOS sensors.

Further to the known binning techniques methods are also known, in which the resolution of an image is changed by means of an interpolation, such as it is described in detail in the US patent documents U.S. Pat. Nos. 7,567,723 and 7,286,721. Generally known interpolation methods are, e.g., the so-called nearest neighbor interpolation, the bilinear interpolation, as well as the bicubic interpolation (see, e.g., FIG. 4 of U.S. Pat. No. 7,567,723).

All these interpolation methods are based on the exemplary model assumption that the brightness value of a pixel exists in the point. For interpolation, these methods make use of functions which assume the brightness values at the point-like locations of the first pixels and they then determine the brightness values of the second pixels at a point-like location of this function. This process is pictured, e.g., in FIG. 4 of U.S. Pat. No. 7,567,723 in a manner that is easy to understand.

With the known interpolation methods the resolution of the image data of an image sensor can be changed. However, the inventor has found that the image data, which have been changed in their resolution in this manner, do not have characteristics that correspond to the image data that would be expected from an image sensor with a correspondingly changed pixel size and number. The interpolation, so to speak, provides a brightness value of a virtual output pixel (second pixel) at a different location than the input pixels (first pixels) that form the input image. However, according to the insight of the inventor, the interpolation, as a matter of principle, does not lead to a result that corresponds to the generation of image data with an image sensor that is correspondingly dimensioned with respect to the pixel size and number, wherein, moreover, the result is often dependent on the position of the virtual second pixels between the first pixels.

SUMMARY OF THE INVENTION

It is an object of the invention to provide an image processing apparatus for processing image data of an image sensor with a regular arrangement of first pixels, wherein the image processing apparatus makes it possible to determine a brightness value for each of two or more virtual second pixels at different intermediate positions between the first pixels, wherein the virtual second pixels have characteristics which, in comparison to the results of the known interpolation methods, better correspond to what would be expected from "real" pixels.

According to the first aspect of the invention, an image processing apparatus for processing image data of an image sensor with a regular arrangement of first pixels is provided, wherein the image processing apparatus is configured to determine a brightness value for each of two or more virtual second pixels of the same size at different intermediate positions between the first pixels, wherein the determination of the respective brightness value comprises an interpolation of the pixels of a neighborhood of the respective intermediate position, the neighborhood comprising several of the first pixels, by means of an associated local filter, wherein each of the local filters comprises a plurality of filter coefficients, wherein for at least one of the local filters more than one of the filter coefficients is unequal to zero, and wherein the sum of the squared filter coefficients for each of the local filters is equal to a constant value, which according to a first condition is the same for all local filters.

The invention is based on the insight of the inventor that images of which the resolution is changed by means of the known interpolation methods do not have characteristics that correspond to the image data that would be expected from an image sensor with a correspondingly changed pixel size and number. How exactly a pixel with a different size behaves will be described in the following based on the model of a pixel from the standard 1288 of the European Machine Vision Association, the so-called EMVA standard 1288 (release 3.0 dated 29 Nov. 2010). This pixel model is linear and leads to the relationship between the signal of the pixel and its noise described in the standard. Based on the assumption that all brightness values of the image data generated by the image sensor stem from first pixels that adhere to this pixel model, also the brightness values of the virtual second pixels should adhere to this standard and should comprise a corresponding relationship between the signal and the noise.

FIG. 4 shows schematically and exemplarily the effect of a known interpolation on the characteristics of a pixel. For this purpose, a signal value c for an output pixel 82, the position of which is exactly in the middle between input pixel 80 and 81, is determined as a result from the left input pixel 80 with a signal value a and the right input pixel 81 with a signal value b. The small deviations in the height of the pixels 80, 81, 82, and 83 shown in FIG. 4 are not present in reality and only serve to make their outlines more easily recognizable in the representation. That is, contrary to the representation in FIG. 4, the pixels 80, 81, 82, and 83 have an identical extent in the vertical direction.

If, in this case, a linear interpolation is performed separately or as a substep of a bilinear interpolation, the equation for the calculation of the signal value c is:

$$c = \frac{1}{2} * (a+b).$$

This is the known equation for forming a mean value. This equation indicates almost expressis verbis what happens physically when performing the linear interpolation. By means of the addition a+b of the signal values of the pixels 80 and 81 the signal value of a superpixel 83 is formed, the area of which comprises the areas of the pixels 80 and 81 and which therefore comprises an area twice as large as the input pixels. The signal value of this twice-as-large superpixel 83 is multiplied with the gain factor ½, such that the correct brightness is obtained. Thus, the linear interpolation in this case leads to the result that the output pixel comprises a twice as large area compared to the input pixels and a gain factor that is half as large.

The same or similar effects become apparent for the linear or bilinear interpolation also for other positions of output pixels. Furthermore, the same or similar effects also show up when using other methods for interpolation, e.g., when using a cubic or bicubic interpolation as well as when using a spline interpolation.

Now, if image data from output pixels, the values of which have been determined with one of the known interpolation methods, are examined by means of the methods of the EMVA standard giving the size of the output pixels, results are obtained that are not physically sensible. For example, due to the interpolation the determined value for the quantum efficiency increases considerably (see also FIG. 18 and the accompanying explanations at the end of the description). This is implausible, since also when using an interpolation the ratio of the photons that are translated to photoelectrons to the total number of impinging photons remains constant. The observed increase of the measurement value, however, results from the fact that by means of the interpolation a spatially non-uniformly distributed change of the pixel size is performed and that the larger output pixels indeed collect photoelectrons over a larger area then assumed for the calculation.

The change of the pixel size by means of known interpolation methods also has immediate effects on the image quality. Viewers often describe interpolated images as less sharp than their originals. A plausible explanation is provided by the insight that pixels, since they integrate the photoelectrons over a defined area, provide a spatial lowpass effect. This can be read from the MTF curve (modulation transfer function) and follows the physical laws described in James R. Janesick, "Scientific Charge-Coupled Devices," Bellingham 2001, Chapter 4.2.2. Now, if, e.g., the pixel area is increased, the spatial lowpass effect changes insofar as the gain decreases for high spatial frequencies. As a result, the energy of the image, which is considered here as the integral over the squared absolute values of the spatial frequencies, also decreases.

This insight was verified by applying an interpolation to artificially generated noise images. Images that solely consist of white noise have the advantage that all frequencies are present therein with the same amplitude and that the effect of mathematical operations on the spatial frequency distribution, and, thus, on the image energy, can be nicely examined thereon.

FIG. 5 shows schematically and exemplarity the results of such an experiment. An artificially generated first image of a size of 2048×2048 pixels (first pixels) with a Gaussian white noise having a standard deviation of 32 digital values (DN) was generated. Then, the column-wise noise N was determined as the standard deviation and plotted in FIG. 5(a) over the horizontal position x. As expected, within the scope of the expectable divisions, the graph assumes a mean value of 32 DN and, therefore, correctly corresponds to the theoretical value.

For comparison, the first image was bilinearly interpolated to generate a second image with a resolution of 31/32 of the original image, i.e., with a resolution of 1984×1984 pixels (second pixels). As a pure interpolation, without considering the change of the pixel size, a standard deviation of 32 should still result while maintaining the image energy. However, the results show a considerable decrease of the noise to values that periodically oscillates between 18 DN and 26 DN. This decrease of the noise is indicative of a corresponding decrease of the image energy, which is perceived by a viewer as a disadvantageous loss of image sharpness. This decrease shows a spatial periodicity which is disturbing when the image is further mathematically analyzed, e.g., according to the EMVA standard 1288.

This behavior of the bilinear interpolation was verified in tests with real cameras. In doing so, it was found that the change of the noise by means of the interpolation strongly interfere with, or even makes possible, the survey or measuring of the camera according to the EMVA standard 1288, which results in an additional serious disadvantage.

In view of these disadvantages, it is proposed according to the invention that for two or more virtual second pixels of the same size at different intermediate positions between the first pixels, the determination of the respective brightness value comprises an interpolation of the pixels of a neighborhood of the respective intermediate position, the neighborhood comprising several of the first pixels, by means of an associated local filter, wherein each of the local filters comprises a plurality of filter coefficients, wherein for at least one of the local filters more than one of the filter coefficients is unequal to zero, and wherein the sum of the squared filter coefficients for each of the local filters is equal to a constant value, which according to a first condition is the same for all local filters. By choosing filter coefficients that fulfill this condition, it is possible to determine the brightness values of the virtual second pixels by means of the interpolation such that the virtual second pixels have characteristics which, in comparison to the results of the known interpolation methods, better correspond to what would be expected from "real" pixels, since the transmission of the noise now occurs in a spatially homogeneous manner. In this way, e.g., a periodic change of the noise, as it was described above, can be avoided.

The local filters are preferably linear filters. Since the virtual second pixels shall adhere as much as possible to a linear pixel model according to the EMVA standard 1288, the interpolation is preferably performed, under the assumption that also all first pixels adhere to the linear pixel model according to the EMVA standard 1288, by means of a mathematical operation that itself is linear and that, moreover, can be formulated as a filtering. This linear filtering is realized for each of the different intermediate positions by means of an associated local filter with a plurality of filter coefficients. Since for at least one of the local filters more than one of the filter coefficients is unequal to zero, a "real" interpolation can be realized, in which the brightness value of the virtual second pixels is determined on the basis of more than one of the first pixels. Depending on the location of the different intermediate positions and/or the size of the virtual second pixels, more than one of the filter coefficients can be unequal to zero for more than one of the local filters and, as the case may be, also for each of the local filters. The term "intermediate position" is to be understood in this context such that it can also indicate a position that coincides with the position of one of the first pixels.

Here the term "local" indicates that the filters used in the interpolation have a finite filter size. Only with a filter with a finite, i.e., limited, size, a result can be achieved with a finite processing time and/or a finite amount of resources. The local filters are applied to the neighborhood of the respective intermediate position, which respectively comprises several of the first pixels.

Depending on whether a reduction or a magnification of the resolution of the image data of the image sensor is to be achieved with the help of the inventive interpolation, as well as depending on the position in the image data and the desired strength of the change, one or more of the different intermediate positions can be located between immediately neighboring first pixels.

The effect of the local filters on the noise can be explained with the help of the Gaussian law of error propagation, which describes the propagation of uncertainties of error-prone values that are independent of each other. By applying this law to the linear filtering, the inventor arrives at the inventive insight that the transmission of the noise occurs in a spatially homogeneous manner exactly in the case where for each of the local filters the sum of the squared filter coefficients corresponds to a constant value (first condition).

According to an advantageous embodiment, the constant value, according to a second condition, corresponds to the square of a noise gain, wherein the noise gain corresponds to the product of a predetermined gain of the virtual second pixels relative to a gain of the first pixels and the reciprocal of the square root of a predetermined relative pixel size (w), when the relative pixel size corresponds to the ratio of the size of the virtual second pixels to the size of the first pixels. If the second condition is fulfilled, the transmission of the noise not only occurs in a spatially homogeneous manner, but the gain value for the transmission of the noise also corresponds to the desired size of the output pixels (second pixels). The term "gain" is to be understood in this context such that it can also mean an attenuation of the noise, i.e., a change of the noise by a factor smaller than 1, or a constancy of the noise (factor equal to 1).

The second condition can be explained as follows: According to the pixel model of the EMVA standard 1288, the statistics of the photons and photoelectrons follows a Poisson distribution, respectively. Now, if the size of a pixel is changed by a factor w (relative pixel size), also the mean values for the received photons $\mu_p$ and for the photoelectrons $\mu_e$ increase by the same factor w, independent of a gain g. Since, due to the given Poisson distribution, the mean values $\mu_p$ and $\mu_e$ are equal to the associated variances $\sigma_p^2$ and $\sigma_e^2$, also these values increase by the factor w and, accordingly, the associated noise increases by the square root of w. Now, if the gain of the input pixels (first pixels) and additionally a predetermined gain g (see also in the following) is applied to the noise, one finds that the output noise, measured in DN, should increase by a factor R (noise gain) that is equal to g times the square root of w. The term "relative pixel size" is understood here to describe a change of the area of the virtual second pixels relative to the area of the first pixels. For instance, if the virtual second pixels are 1.5 times as large as the first pixels both in the width and in the height, the relative pixel size w results to 1.5×1.5 equal to 2.25, i.e., the area of the virtual second pixels is enlarged by a factor w equal to 2.25 compared to the area of the respective first pixels.

According to a further advantageous embodiment, the filter coefficients for each of the local filters additionally fulfill a third condition that the sum of the filter coefficients is equal to the predetermined gain. By means of the gain of the local filters, the desired output brightness can be set relative to the input brightness. For instance, it can be desired that the virtual second pixels exhibit a same convergence gain K according to the EMVA standard 1288 as the first pixels. In this case, the gain should be selected such that it corresponds to the relative pixel size. However, it can, e.g., also be desired that the output image (virtual second pixels) exhibits a same brightness, measured in DN, as the input image (first pixels). In this case, the gain should be selected to be equal to 1.

According to a further advantageous embodiment, the filter coefficients for each of the local filters additionally fulfill a fourth condition that the center of gravity of the filter coefficients corresponds to the associated intermediate position. Since the intermediate positions correspond to the center points of the virtual second pixels, respectively, geometrical distortions, which could otherwise result from the interpolation, can be avoided in this manner. Such a geometrical distortion would be, e.g., that a straight edge from the input image would not be recognizable in the output image as a straight edge anymore, but, e.g., as an annoying wave pattern.

According to yet a further advantageous embodiment, the size of the local filter is selected for each of the local filters such that the respective virtual second pixel is completely located within the local filter in the interpolation. As a result, all photons that are detected on the area of the respective virtual second pixel also contribute to the calculation of the brightness value of the virtual second pixel and there exists no part of the area of the virtual second pixel in which impinging photons get lost, so to say, since they cannot be considered when being outside of the neighborhood and, therewith, outside of the effective range of the local filter.

According to yet a further advantageous embodiment, the interpolation is a one-dimensional interpolation, wherein each of local filters is a one-dimensional local filter by means of which a one-dimensional interpolation is performed. In this case, the resolution of the image data can be changed by means of the interpolation in a simple and efficient manner in one dimension, e.g., in the width or in the height.

According to yet a further advantageous embodiment, the interpolation is a two-dimensional interpolation, wherein each of the local filters is a two-dimensional local filter by means of which the two-dimensional interpolation is performed, or wherein each of the local filters corresponds to the dyadic product of two one-dimensional local filters by means of which the two-dimensional interpolation is performed as two subsequently performed one-dimensional interpolations. In this case, the resolution of the image data can be changed by means of the interpolation in two dimensions, e.g., in both the width and the height. By realizing the respective local filter as two one-dimensional local filters that are subsequently executed, a simple and very efficient implementation can be provided.

According to yet a further advantageous embodiment, the size of the two-dimensional local filters the same in the two dimensions, or the size of the two one-dimensional filters in the respective one dimension is the same. With such local filters, which, e.g., have the same size both in the width and the height, annoying anisotropic effects can be avoided.

According to yet a further advantageous embodiment, the one-dimensional local filter or the two one-dimensional local filters have an even-numbered size in the respective one dimension, or the two-dimensional filter has an even-numbered size in each of the two dimensions. If the neighborhood is selected such that the center point of a virtual second pixel according to FIG. 6 has the coordinate 0≤x<1 and 0≤y<1, the same number of center points of the first pixels 64 have an x-value smaller or equal to the x-value of the second pixel center point 62 as pixel center points have an x-value larger than the x-value of the second pixel center point, and the same number of first pixel center points have a y-value smaller or equal to the y-value of the second pixel center point as pixel center points have a y-value larger than the y-value of the second pixel center point. This results in a symmetrical problem with which annoying anisotropic effects can be avoided and the amount of computation can be kept small. Or, in other words: Therewith results a symmetry of the neighborhood 60 around the central square 65.

According to yet a further advantageous embodiment, a relative side length of the virtual pixels, which corresponds to the ratio of the length of one side of the virtual second pixels to the length of a corresponding side of the first pixels, is smaller or equal to 2, wherein for each local filter the size of the local filter in a dimension in the direction parallel to the side is equal to 4.

According to yet a further advantageous embodiment, the image processing apparatus comprises a storage in which the filter coefficients of the local filters are stored for use in the interpolation. Thus, the filter coefficients only have to be determined once in advance and stored in the storage. A repeated setting of the filter coefficients for each new filter process can therewith be avoided.

According to yet a further advantageous embodiment, the image processing apparatus comprises an adjusting element for adjusting at least the relative pixel size, e.g., 1.5×1.5, if the virtual second pixels shall be 1.5 times as large as the first pixels both in the width and in the height, wherein the image processing apparatus is configured to set the filter coefficients of the local filters based on the adjusted relative pixel size. This results in a large flexibility, since the filter coefficients do not have to be determined in advance, but can be set, e.g., in a digital camera, which comprises an image sensor with a regular arrangement of first pixels for generating image data and the inventive image processing apparatus for processing the image data of the image sensor, during the configuration of the digital camera (or even during the operation) based on the adjusted relative pixel size set, e.g., by a user of the digital camera. In addition to the relative pixel size, it is preferred that also the gain of the virtual second pixels relative to a gain of the first pixels can be adjusted by means of the adjusting element, wherein the image processing apparatus is then preferably configured to set the filter coefficients of the local filters based on the adjusted relative pixel area and the adjusted gain. Furthermore, it can also be advantageously foreseen that also the resolution of the output image (virtual second pixels) is adjustable by means of the adjusting element. In this case, the resolution does not follow automatically from the ratio of the size of the virtual second pixels to the size of the first pixels, but can be predetermined separately. Therewith, applications can be realized, in which the digital camera, e.g., firstly transmits images of low resolution with a high image refresh rate or with a low data rate, and only if an event is detected in the images, the same camera generates a high resolution image, in which additional details, e.g., a license plate, are recognizable. The adjusting element can comprise. e.g., a control, such as a slide control or a rotary control, a register, a digital interface, or the like.

According to a further advantageous embodiment, the setting of the filter coefficients comprises a determining of filter coefficients according to a synthesis function, wherein the determined filter coefficients preferably fulfill the first and the third condition, as well as a correcting of the determined filter coefficients or of the synthesis function based on a second and/or a third correction function in such a way that corrected filter coefficients are obtained that additionally fulfill the second condition and/or the fourth condition.

According to a further aspect of the invention, an image processing apparatus for processing image data of an image sensor with a regular arrangement of first pixels of a first pixel size for generating image data comprising virtual second pixels of a second pixel size is provided, wherein the second pixel size is not an integer multiple of the first pixel size, wherein the image processing apparatus is configured to compute a brightness value for each virtual second pixel.

In this way, it is possible, by processing the image data generated by the image sensor, which comprise pixels of a first pixel size, to generate image data that comprise virtual second pixels of a second pixel size, which substantially correspond to what would be expected from "real" pixels of the second pixel size, wherein the second pixel size is a non-integer multiple of the first pixel size. If the generated image data are examined in the manner specified in the EMVA standard 1288 under the assumption of the second pixel size, values are obtained that substantially correspond to what would be expected from an image sensor that corresponds to the image sensor, but that has a regular arrangement of pixels of the second pixel size.

Here, it is particularly preferred that the processing substantially does not change the quantum efficiency of the virtual second pixels compared to the quantum efficiency of the first pixels. In this case, the value of the quantum efficiency of the virtual second pixels in percent deviates from the quantum efficiency of the first pixels by less than plus/minus 10, preferably by less than plus/minus 5, more preferably by less than plus/minus 2. Thus, if, e.g., the quantum efficiency of the first pixels—measured according to the EMVA standard 1288 at a nominal wavelength, preferably the wavelength at which the quantum efficiency of the image sensor is maximum—is 60%, the quantum efficiency of the virtual second pixels—measured in a corresponding manner according to the EMVA standard 1288 at the same nominal wavelength—is between 50% and 70%, preferably between 55% and 60%, more preferably between 58% and 62%. It is further preferred that the image processing apparatus is the image processing apparatus according to one of claims 1 to 11.

According to a further aspect of the invention, a digital camera is provided, wherein the digital camera comprises: an image sensor with a regular arrangement of first pixels for generating image data; and the image processing apparatus as defined in any of claims 1 to 12 for processing the image data of the image sensor.

According to a further aspect of the invention, an image processing method for processing image data of an image sensor with a regular arrangement of first pixels is provided, wherein the image processing method determines a brightness value for each of two or more virtual second pixels of the same size at different intermediate positions between the first pixels, wherein the determination of the respective brightness value comprises an interpolation of the pixels of a neighborhood of the respective intermediate position, the neighborhood comprising several of the first pixels, by means of an associated local filter, wherein each of the local filters comprises a plurality of filter coefficients, wherein for at least one of the local filters more than one of the filter coefficients is unequal to zero, and wherein the sum of the squared filter coefficients for each of the local filters is equal to a constant value, which according to a first condition is the same for all local filters.

According to a further aspect of the invention, a computer apparatus is provided, wherein the computer apparatus comprises a processing unit that is configured to perform the image processing method as defined in claim 14.

According to a further aspect of the invention, a computer program product is provided, wherein the computer program product comprises coding for causing a computer apparatus to perform the image processing method as defined in claim 14, when the computer program product is executed on the computer apparatus.

It is understood that the image processing apparatus of claim 1, the digital camera of claim 13, the image processing method of claim 14, the computer apparatus of claim 15, and the computer program product of claim 16 have similar and/or identical preferred embodiments, in particular as defined in the dependent claims.

It is also understood that a preferred embodiment of the invention can be any combination of the independent claims with the respective dependent claim.

BRIEF DESCRIPTION OF THE DRAWINGS

Preferred embodiment of the invention are described in more detail in the following with reference to the attached figures, wherein.

DETAILED DESCRIPTION OF THE EMBODIMENTS

Figure 1:
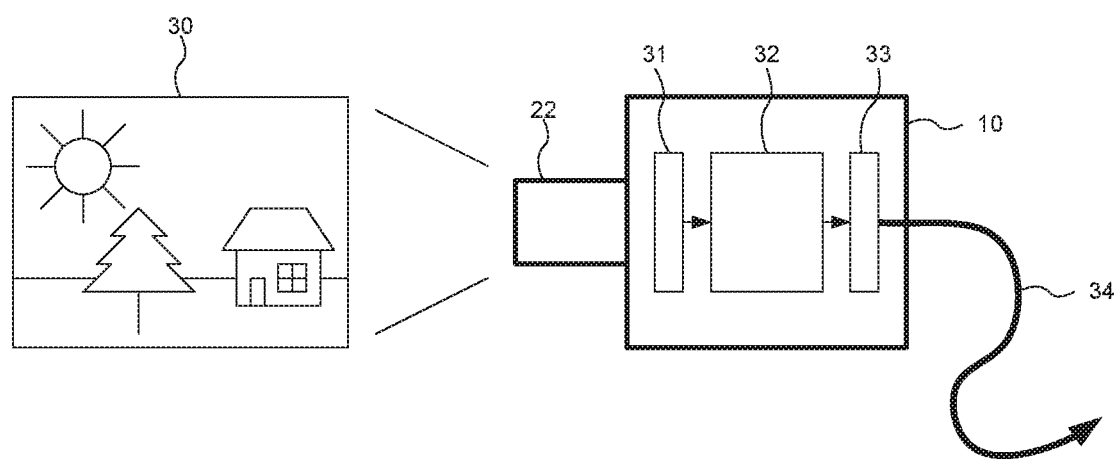
FIG. 1 is a schematic, exemplary view of the structure of a digital camera.
Figure 2:
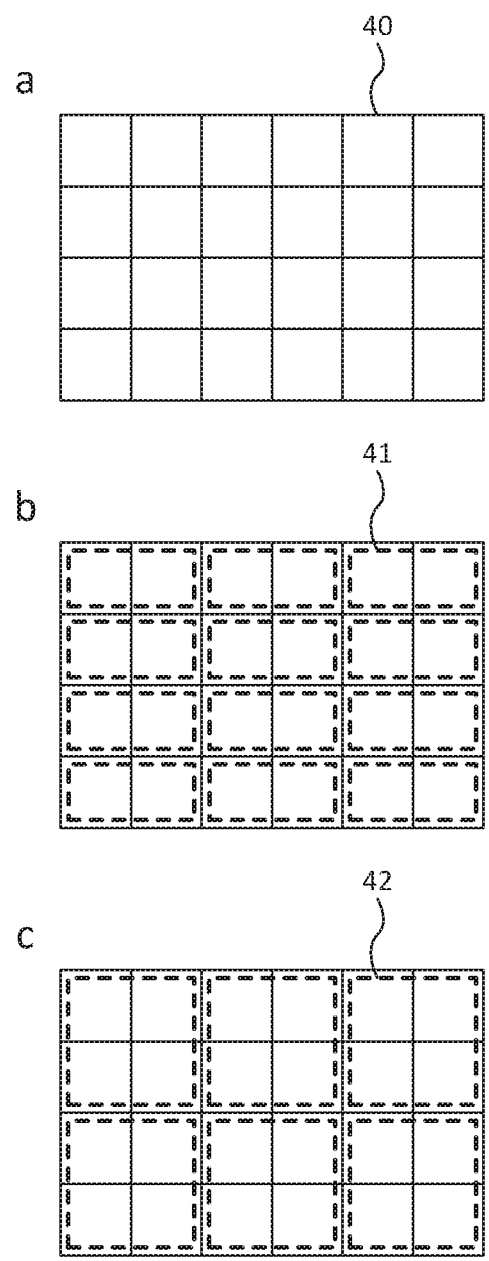
FIG. 2 is a schematic, exemplary view of two different binning processes.
Figure 3:
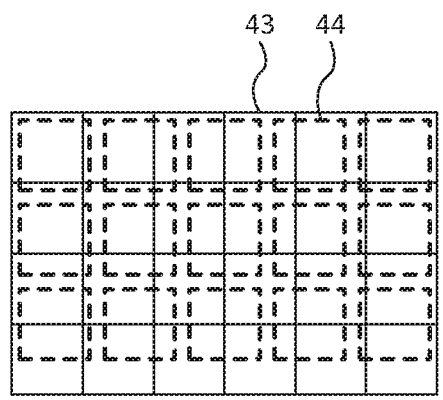
FIG. 3 is a schematic, exemplary view of an example of a non-integer, rational multiple of the side lengths of the second pixels relative to the side lengths of the first pixels.

In the figures, the same or corresponding elements or units are provided with the same or corresponding reference numerals. In case an element or a unit has already been described in the context of a figure, a detailed explanation may be dispensed with in the context of another figure. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 6:
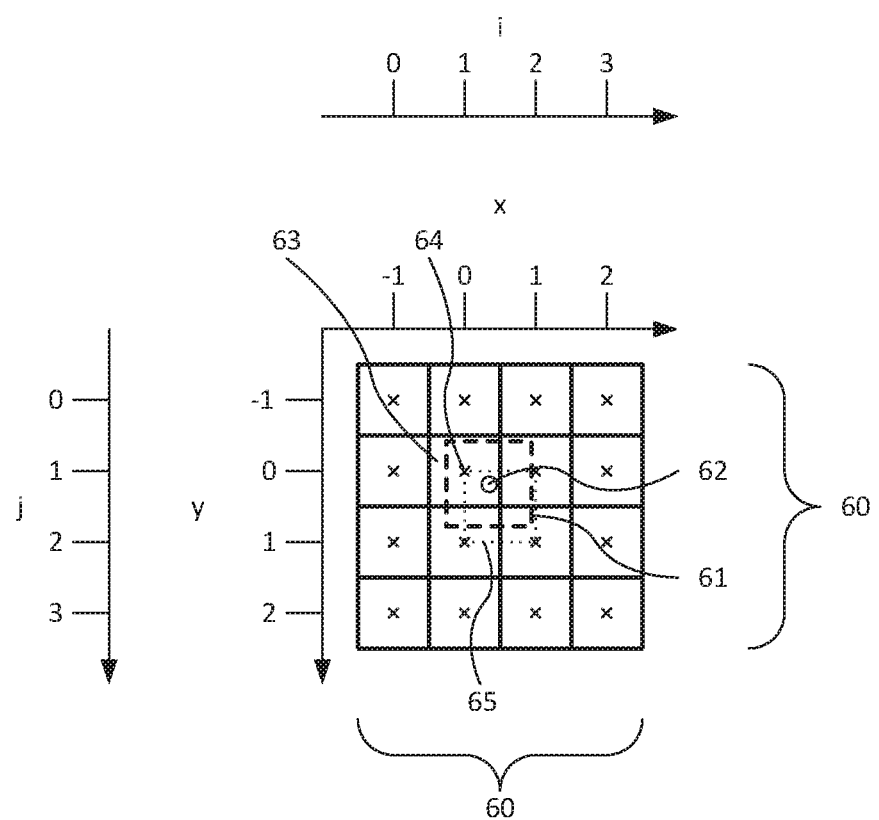
FIG. 6 is a schematic, exemplary view of a neighborhood of an intermediate position, the neighborhood comprising several of the first pixels, for determining the brightness value of a virtual second pixel through an interpolation by means of a local filter.

FIG. 6 shows schematically and exemplarily a neighborhood, which comprises several of the first pixels 60, of an intermediate position 62 for determining the brightness value of a virtual second pixel 61 through interpolation by means of a local filter. In the example shown here, the size of the neighborhood is 4×4 input pixels (first pixels) 60 for calculating the brightness value of the output pixel (virtual second pixel) 61. Thereby, the neighborhood is selected such that the intermediate position 62, which corresponds to the center point of the virtual second pixel 61, is located in a central square 65 of the neighborhood. In the case shown here, the input pixels 62 are indexed by two counting variables i and j. The relative position of the output pixel 61 is described, without limiting the generality, by the two position values x and y with respect to the selected neighborhood. The value ranges here are $-1 \leq x \leq 2$ and $-1 \leq y \leq 2$. Thereby, the first pixel 63 is selected as the reference input pixel with the position x=0 and y=0.

Figure 5A:
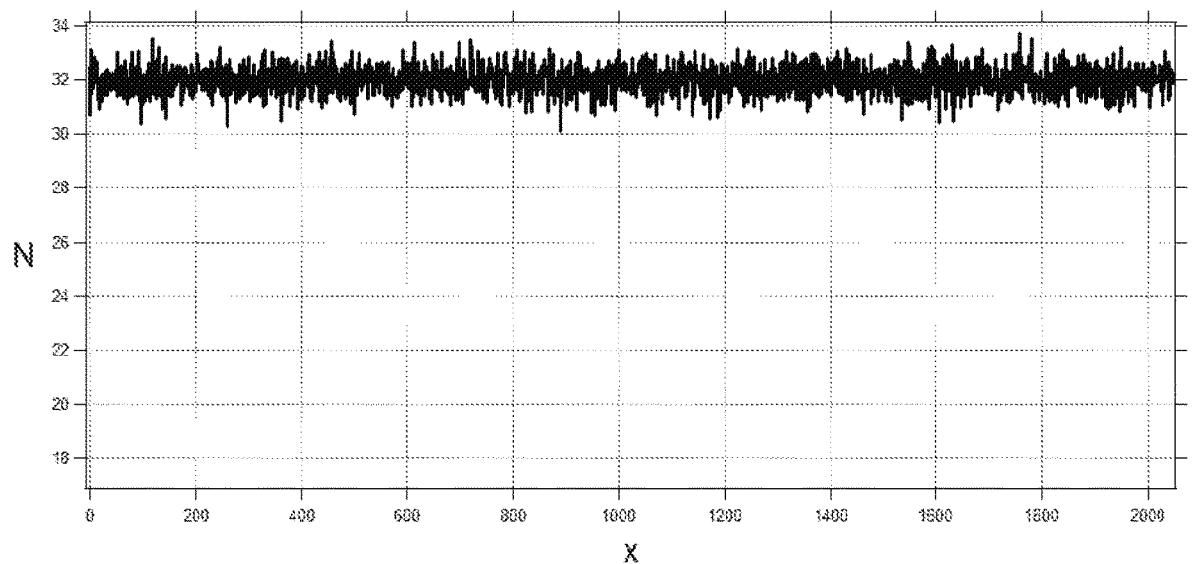
FIG. 5 is a schematic, exemplary view of the result of an experiment, in which an interpolation was applied to artificially generated noise images.
Figure 5B:
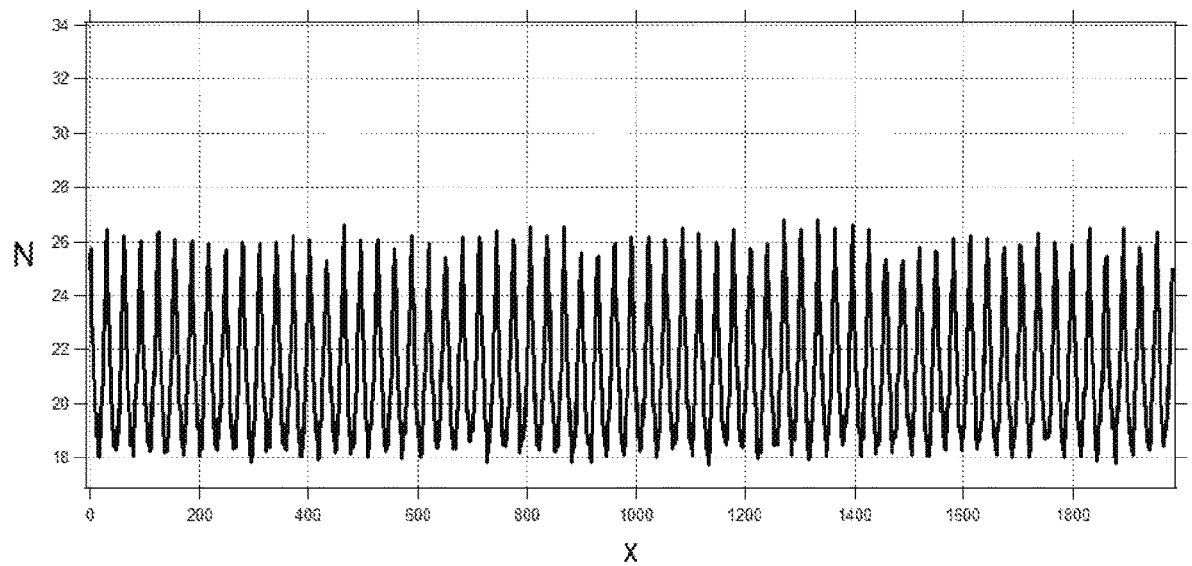

The size of the neighborhood is equal to the size of the local filter. Here, the filter size is selected such that, on the one hand, the virtual second pixel 61 with the predetermined relative pixel size is completely located within the neighborhood and within the local filter, respectively, in the interpolation, and that, on the other hand, the resulting computational burden due to a too large selection of the neighborhood is not too large. Furthermore, it is proposed to select the width and the height of the neighborhood to be of equal size, such that disadvantageous anisotropy effects are avoided. Finally, it is proposed to select the neighborhood to be symmetrical with respect to the central square 65. This symmetry simplifies the calculation, reduces unecessary computational burden, and contributes to the avoidance of disadvantageous anisotropy effects. For values of the relative pixel size w that are smaller or equal to 2×2, it is proposed to select the size of the neighborhood for achieving the above-mentioned advantages to be 4×4, as shown in FIG. 5. For larger values of the relative pixel size, a suitably selected larger, square neighborhood with an even number of first pixels per side length is proposed, for instance, 6×6, 8×8, 10×10, et cetera.

As described above, it is proposed according to the invention that for each of two or more virtual second pixels 61 of the same size at different intermediate positions between the first pixels 60, the determination of the respective brightness value comprises an interpolation of the pixels of a neighborhood of the respective intermediate position, the neighborhood comprising several of the first pixels 60, by means of an associated local filter, wherein each of the local filters comprises a plurality of filter coefficients, wherein for at least one of the local filters more than one of the filter coefficients is unequal to zero, and wherein the sum of the squared filter coefficients for each of the local filters is equal to a constant value, which according to a first condition is the same for all local filters. Moreover, the local filters preferably also fulfill one or more of a second condition, a third condition, and a fourth condition, as also described above.

How the filter coefficients of the local filters can be set such that they fulfill the described condition(s) will be described in greater detail in the following:

An interpolation function is selected for a predetermined filters size. This function provides for each intermediate position x or y (one-dimensional) or x and y (two-dimensional) of a virtual second pixel, respectively, the respectively associated filter coefficients values. For reasons of simplification, the intermediate position is only designated as x in the following, wherein x can be considered as being a vector in the case of a two-dimensional interpolation. If the filter coefficient values are only required for a finite number of intermediate positions x, they may also be provided in a table.

The required filter coefficients of the local filters for the interpolation can be determined with the help of a synthesis function, e.g., by sampling the synthesis function in a suitable manner. This sampling is advantageously performed with intervals of 1 in relation to the size of the first pixels and, in particular, such that the center or zeropoint of the synthesis function is shifted to the value of x, respectively. This is symbolized in the following explanations by describing the synthesis function in dependence of a parameter xf, wherein the values xf, at which the synthesis function is sampled for a particular intermediate position x, result to −x+n, wherein x assumes all negative or positive integer values including zero for which the value −x+n is in the value range of the synthesis function. In principle, it is always possible to formulate an at least point-wise defined synthesis function from an arbitrary filter with filter coefficients.

Figure 7:
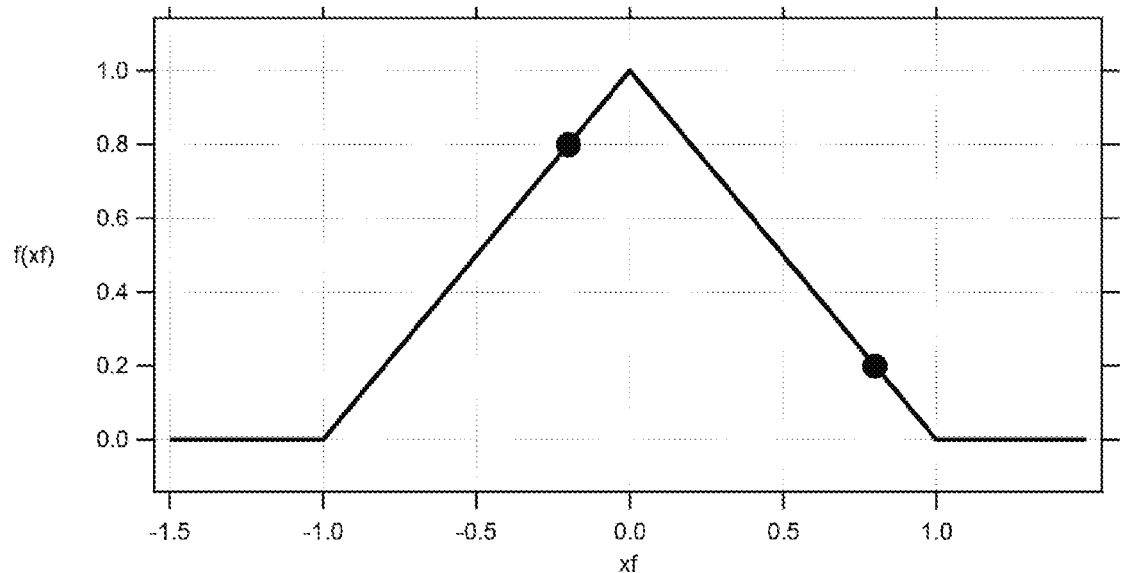
FIG. 7 is a schematic, exemplary view of a synthesis function for a linear interpolation.

FIG. 7 shows schematically and exemplarily a synthesis function for a linear interpolation. The filter coefficients at the intermediate position x=0.2 are sampled, here, at the positions xf=−0.2 (equal to −x+0) and xf=0.8 (equal to −x+1). If a local filter according to this synthesis function is applied in two orthogonal directions, a bilinear interpolation is obtained.

Figure 8:
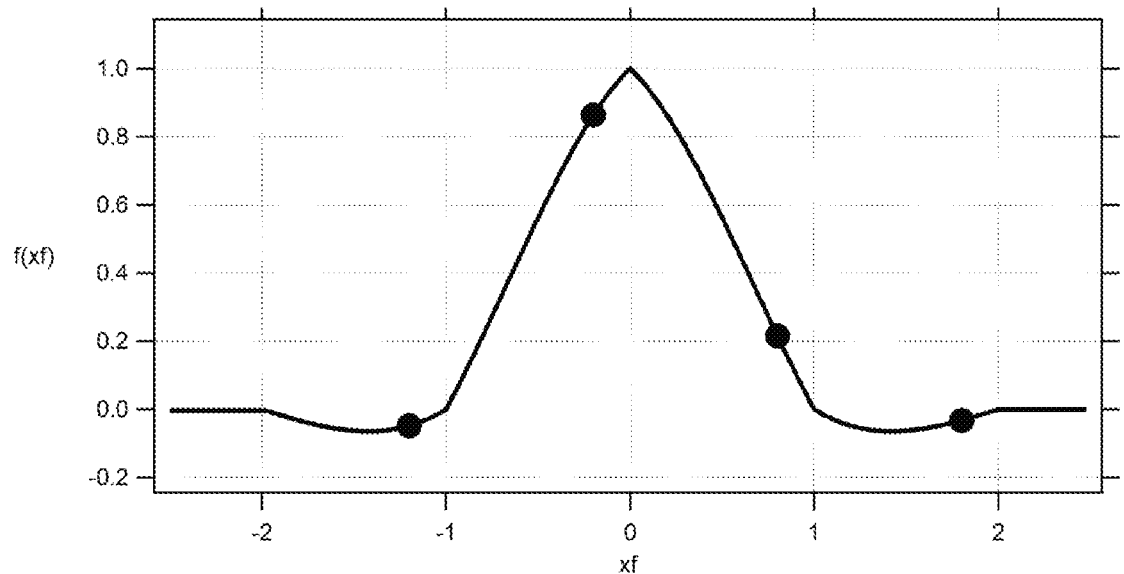
FIG. 8 is a schematic, exemplary view of an alternative synthesis function for a cubic interpolation.

An alternative synthesis function for a cubic interpolation is schematically and exemplarily shown in FIG. 8. The filter coefficients for the intermediate position x=0.2 are sampled, here, at the positions xf=−1.2 (equal to −x+(−1)), xf=−0.2 (equal to −x+0), xf=0.8 (equal to −x+1), and xf=1.8 (equal to −x+2). If a local filter according to this synthesis function is applied in two orthogonal directions, a bicubic interpolation is obtained.

The synthesis function for a linear interpolation according to FIG. 7 and the synthesis function for a cubic interpolation according to FIG. 8 are known from the prior art. They can be taken as a starting point in order to generate, on their basis, synthesis functions for an inventive interpolation by means of the corrections described in the following.

It is generally advantageous if the synthesis function is continuous, since annoying jumps in brightness can thereby be avoided. For example, the interpolation function can be linear, piece-wise linear, quadratic, or cubic. In the two-dimensional case, it can satisfy, e.g., the known bilinear, bicubic, or spline interpolation.

Furthermore, it is advantageous if the synthesis function continuously assumes the value zero at the border of its value range, which results from the predetermined filter size and which, e.g., in FIG. 7 ranges from −1.0 to 1.0 and in FIG. 8 ranges from −2.0 to 2.0, respectively. Therewith, jumps in brightness are particularly avoided when shifting the neighborhood.

It is further advantageous if furthermore also the first derivative of the synthesis function with respect to the position xf assumes the value zero at the border of its value range. Thereby, unnatural-looking brightness profiles with "kinks" in the brightness distribution are avoided. Such brightness profiles are, e.g., visible after application of the known bilinear interpolation.

It is moreover advantageous if the synthesis function is designed such that for all required intermediate positions x the sum of the associated filter coefficients obtained from the synthesis function is the same and, e.g., in the case that the relative pixel size w is equal to 1×1 and the gain g is equal to 1, assumes the value 1. Thereby, the third condition is fulfilled.

On the other hand, if the synthesis function has been selected such that the third condition is not initially fulfilled, the fulfillment of the third condition can be achieved by means of a normalization. One example of a function that does not fulfill the third condition is a Gaussian bell curve. To do so, the associated filter coefficients are divided for each intermediate position x by the previously determined sum of the filter coefficients. This normalization can alternatively also be performed on the synthesis function itself. Since the normalization is performed in a point-wise manner, this can also lead to a change of the form of the curve of the synthesis function.

One can also select a synthesis function that fulfills the fourth condition. This is, e.g., the case if a suitable linear or bilinear or a suitable cubic or bicubic interpolation is selected.

If a synthesis function has been selected that does not fulfill the fourth condition, a correction can be performed. This correction can be achieved in that correction values are added to or multiplied with the synthesis function or the filter coefficients. Thereby, the correction can be performed in such a manner that the third condition, if it was fulfilled before, continues to be fulfilled.

A corresponding second function for an additive correction of the fourth condition (second correction function) can have the characteristic that it is neutral with respect to the third condition. In this case, arbitrary multiples of the second correction function can be added to the synthesis function or to the filter coefficients without the third condition been violated thereby. This neutrality is obtained as a result of the fact that for each intermediate position x, the sum of the values of the second correction function, which are associated to the respective filter coefficients values for the intermediate position x, amounts to zero. This is exactly the case when the sum of the values of the second correction function, when sampled with an equidistant spacing of 1, becomes zero, independent of the intermediate position x.

Furthermore, it is advantageous to demand that the second correction function has, for all intermediate positions x, the characteristic that a change of the center of gravity can be achieved by addition of this function to the synthesis function. This is achieved by the second correction function exactly in the case where the torsional moment of the sampling values (given an equidistant sampling with the spacing of 1) is unequal to zero.

In order to illustrate this situation, the notion of the torsional moment of a local filter is defined in analogy to classical mechanics as the sum of the products of the filter coefficients with their respective positions in the synthesis function. Therewith, the last mentioned requirement becomes the statement that the torsional moment of the second correction function is unequal to zero for all intermediate positions x.

Figure 9:
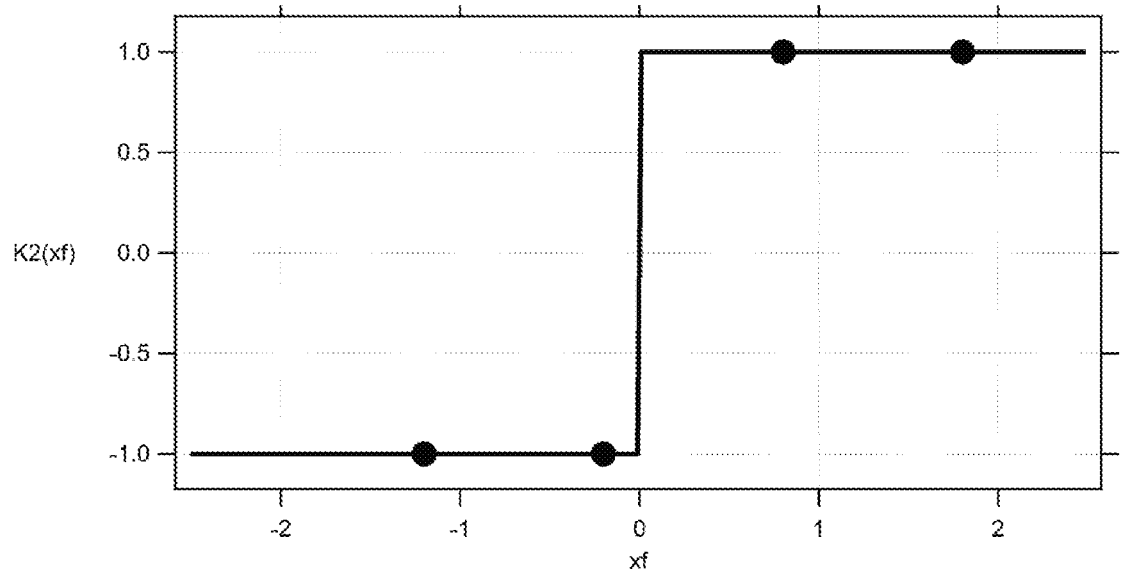
FIG. 9 is a schematic, exemplary view of a sign function as a second function for the correction of the position of the center of gravity.
Figure 10:
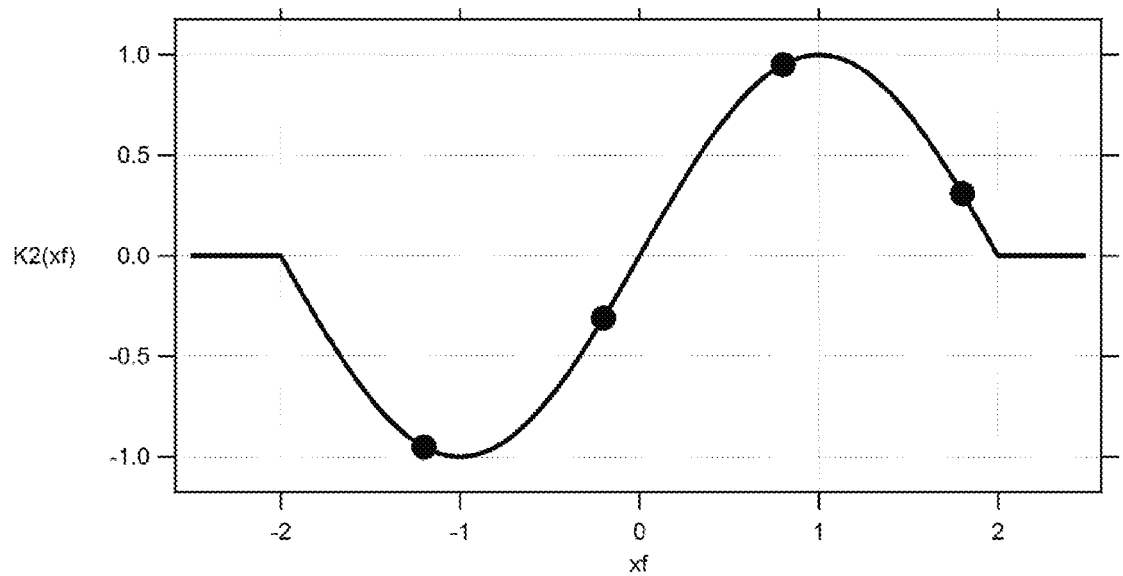
FIG. 10 is a schematic, exemplary view of a single sine wave as a second function for the correction of the position of the center of gravity.
Figure 11:
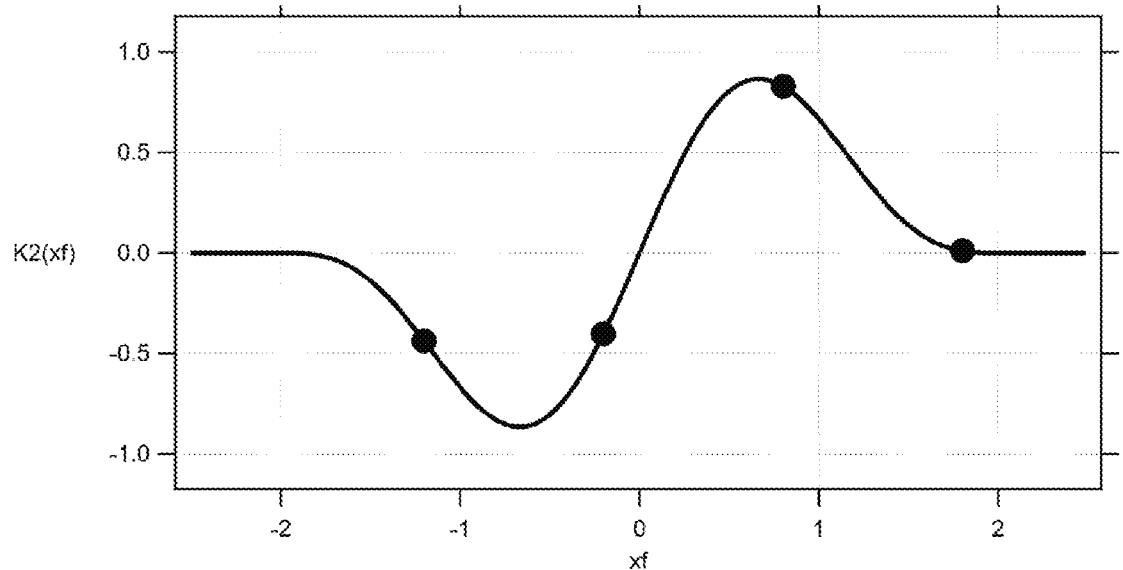
FIG. 11 is a schematic, exemplary view of a spatially limited function, which is continuously differentiable at a border region, as a second function for the correction of the position of the center of gravity.

FIGS. 9 to 11 show schematically and exemplarily functions that can be used as a second function for a correction of the position of the center of gravity.

As a first example of a second correction function K2(xf), the sign function K2(xf)=sgn(xf) is shown in FIG. 9, which for positions xf<0 assumes the value −1 and for positions xf>0 assumes the value 1. This function fulfills the above-described prerequisites for the second correction function. However, it has the disadvantage that its spatial extent is not limited and that this therefore also applies to the spatial extent of the artifacts that may be generated by the function.

As a second example of a second correction function K2(xf), a rectangle function that is windowed with a sine wave may be mentioned, i.e., a single sine wave of the form K2(xf)=sin($\omega$*xf)*$\Theta$($\pi$/$\omega$−|xf|). Here, $\Theta$(xf) is the unit step function that is also referred to in the literature as Heavyside function. Due to the windowing, K2(xf) assumes, in this case, the value zero to the left of its negative half-wave and to the right of its positive half-wave. Such a function is shown in FIG. 10 for $\omega$=$\pi$/2. For the regions with xf<−2 and xf>2, the function assumes the value zero, respectively. Compared to the before-mentioned functions, this function has the advantage that it continuously assumes a value of zero at the border of its effective range and, thus, that the spatial extent of the artifacts that may be generated by this function is limited.

As a third example of a suitable correction function K2(xf), a function may be mentioned that is continuously differentiable and becomes zero at the border of its effective range. Such a function is the function K2(xf)=(⅔*sin($\omega$*xf)+⅓*sin(2$\omega$*xf))*$\Theta$($\pi$/$\omega$−|xf|), which is schematically and exemplarily shown in FIG. 11. For the regions with xf<−2 and xf>2, also this function assumes the value zero, respectively. Compared to the before-mentioned functions, this function has the advantage that it is continuously differentiable and becomes zero at the border of its effective range, wherefore the spatial extent of the artifacts that may be generated by the function is limited and visible "kinks" in the brightness profile are avoided.

A correction of the position of the center of gravity with a second correction function can be achieved in such a way that for each intermediate position x the torsional moment of the synthesis function is determined as a value u(xf) and the torsional moment of the second correction function is determined as a value v(xf), and that from these values a position independent mixing factor MF(xf)=−u(xf)/v(xf) is determined. Now, if for each intermediate position x, the MF(xf)-fold of the second correction function is added to the synthesis function, a function F2(xf) is obtained as a result that is free of a torsional moment for all intermediate positions x and, therewith, neutral with respect to the center of gravity.

The second condition can be achieved by addition of a multiple of a third correction function K3(xf). To do so, a function is advantageously used that is neutral with respect to the third and fourth condition. Thus, the fulfillment of the third and fourth condition is still maintained even if a multiple of the third correction function K3(xf) is added.

In this respect, it is proposed to initially select a symmetric correction function E1(xf) that is neutral with respect to the third condition, i.e., which has the characteristic that for all intermediate positions x, the sum of the associated filter coefficients is zero.

Figure 12:
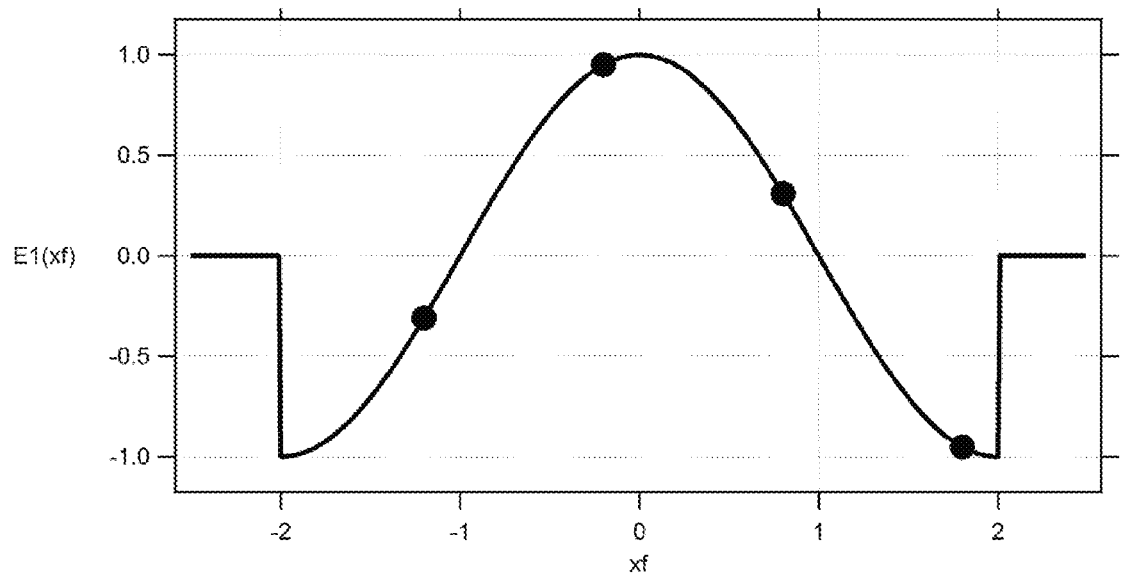
FIG. 12 is a schematic, exemplary view of the function $E1(xf)=\cos(w*xf)*\Theta(3/2*\pi/\omega-|xf|)$ with $\omega=\pi/2$.

This characteristic can often be found in periodic functions with a suitable angular frequency w. It is therefore proposed to use a cosine function of the form E1(xf)=cos($\omega$*xf) as E1(xf). In order to limit the effect and, therewith, also artifacts that may eventually be caused by the function, to a defined spatial region, it is additionally proposed to perform a windowing, e.g., in the form of E1(xf)=cos($\omega$*xf) *$\Theta$(3/2*$\pi$/$\omega$−|xf|). This function is schematically and exemplarily shown in FIG. 12 for $\omega$=$\pi$/2.

Figure 13:
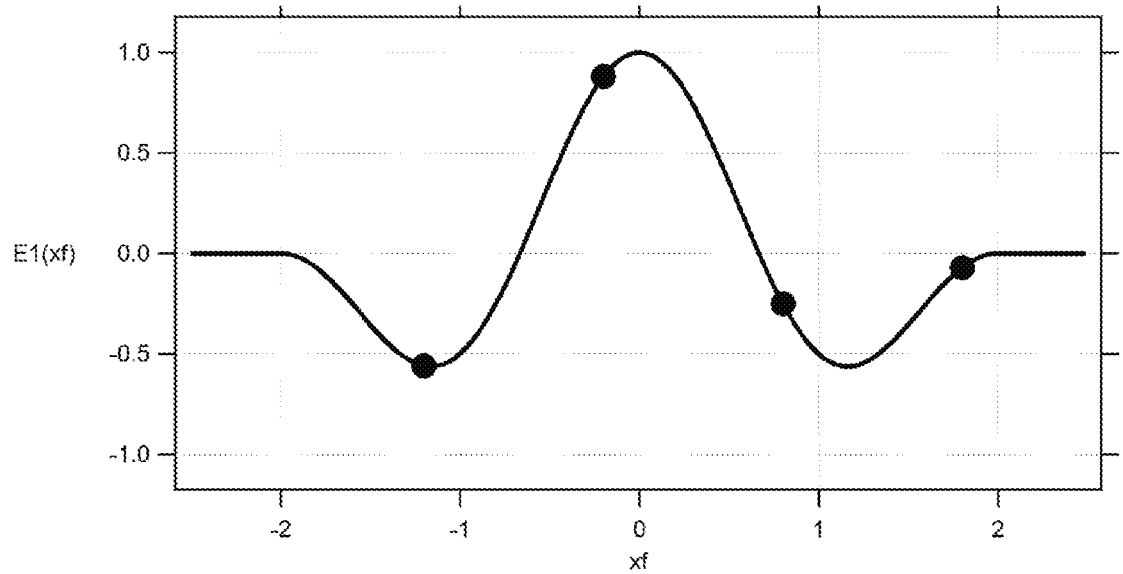
FIG. 13 is a schematic, exemplary view of the function $E1(xf)=(1/2*\cos(\omega*xf)+1/2*\cos(2\omega*xf))*\Theta(\pi/\omega-|xf|)$ mit $\omega=\pi/2$ zeigt.

A further example is provided by the function E1(xf)= (½*cos($\omega$*xf)+½*cos(2$\omega$*xf))*$\Theta$($\pi$/$\omega$−|xf|) with $\omega$=$\pi$. This function is schematically and exemplarily shown in FIG. 13 and is modeled in its form according to the Ricker wavelet, which is also referred to in the literature as the Mexican hat function and which is often used as a sharpening filter for images. In contrast to the Ricker wavelet, the function that is proposed here has the advantage that it is neutral with respect to the third condition for all intermediate positions x, i.e., the sum of the associated filter coefficients is zero in each case. Compared to the function shown in FIG. 12, it has the two advantages that it is continuous at the border of the window and is continuously differentiable.

Figure 14:
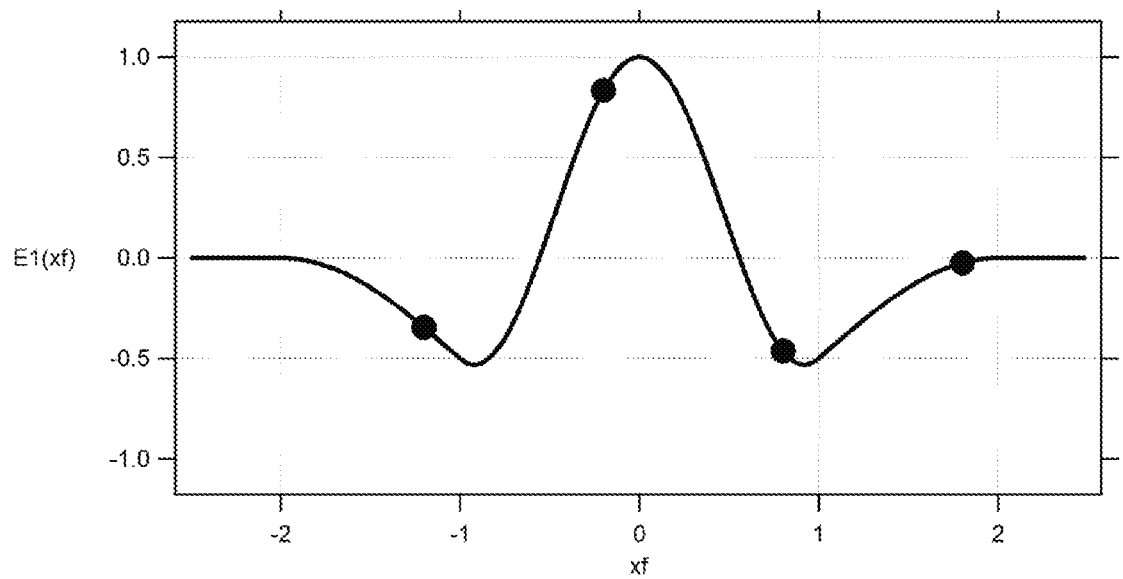
FIG. 14 is a schematic, exemplary view of the function $E1(xf)=2*\cos^2(\omega*xf)*\Theta(1/2*\pi/\omega-|xf|)-\cos^2(\omega*xf/2)*\Theta(\pi/\omega-|xf|)$ mit $\omega=\pi/2$.

A further example is the function E1(xf)=2*cos$^2$($\omega$*xf) *$\Theta$(½*$\pi$/$\omega$−|xf|)−cos$^2$($\omega$*xf/2)*$\Theta$($\pi$/$\omega$−|xf|) with $\omega$=$\pi$/2, which is schematically and exemplarily shown in FIG. 14. Also this function is modeled in its form according to the Ricker wavelet. Compared to the function illustrated in FIG. 13, however, it exhibits a slightly different frequency characteristic.

The proposed correction functions E1(xf), however, do not yet fulfill the fourth condition. It is therefore proposed to add a suitable multiple of a second correction function in the above described manner also to the function E1(xf), whereby a symmetric correction function E2(xf) is obtained, which is free of a torsional moment and, therewith, neutral with respect to the center of gravity. This can be achieved in such a way that for each intermediate position x, the torsional moment of the correction function E1(xf) is determined as a value u2(xf) and the torsional moment of the second correction function K1(xf) is determined as a value v2(xf), and that from these value a position-independent mixing factor MF2(xf)=−u2(xf)/v2(xf) is determined. Now, if for each intermediate position x, the MF2(xf)-fold of the second correction function K1(xf) is added to the correction function E1(xf), a symmetric correction function E2(xf) is obtained as a result that is free of a torsional moment for all intermediate positions x and, therewith, neutral with respect to the center of gravity.

Finally, the second condition can be fulfilled by adding a—as the case may be, position-independent—multiple of the symmetric correction function E2(xf), which is free of a torsional moment and neutral with respect to the brightness, to the synthesis function F2(xf), which is also free of a torsional moment. Since the second condition is a special case of the first condition in which the constant value corresponds to the square of the noise gain R, it is therewith possible to obtain a synthesis function F3(xf) that fulfills all four conditions.

In this respect, it is advantageous to select the mixing factor M(x) such that the synthesis function that is obtained as F3(xf)=F2(xf)+M(xf)*E2(xf) also fulfills the second condition for all intermediate positions x. Since the second condition is that for each of the local filters the sum of the squared filter coefficients corresponds to the square of the noise gain R, M(xf) can be determined for each intermediate position x as the solution of a quadratic equation of the form a*M(xf)$^2$+b*M(xf)+c=0. This solution is obtained by solving the calculation equation of F3(xf). To do so, a value a is determined as the sum of the squared filter coefficients of E2(xf) for each intermediate position x, a value b is determined as twice the sum of the products of the respective filter coefficients of F2(xf) with E2(xf), and a value c is determined as the sum of the squared filter coefficients of F2(xf) minus R. Then M(xf) is obtained as one solution of the quadratic equation by means of the formula $M(xf)=(-b+\sqrt{(b^2-4*a*c)})/(2*a)$. Herein, sqrt designates the square root function.

The theoretically possible second solution of the quadratic equation $M2(xf)=(-b-\sqrt{(b^2-4*a*c)})/(2*a)$ leads to an inversion of the sign of the correction function E2(xf), wherefore it does not have the typical form of a sharpening filter anymore and, therefore, leads to noticeable image artifacts. For this reason, the second solution of the quadratic equation is not further used.

Figure 15:
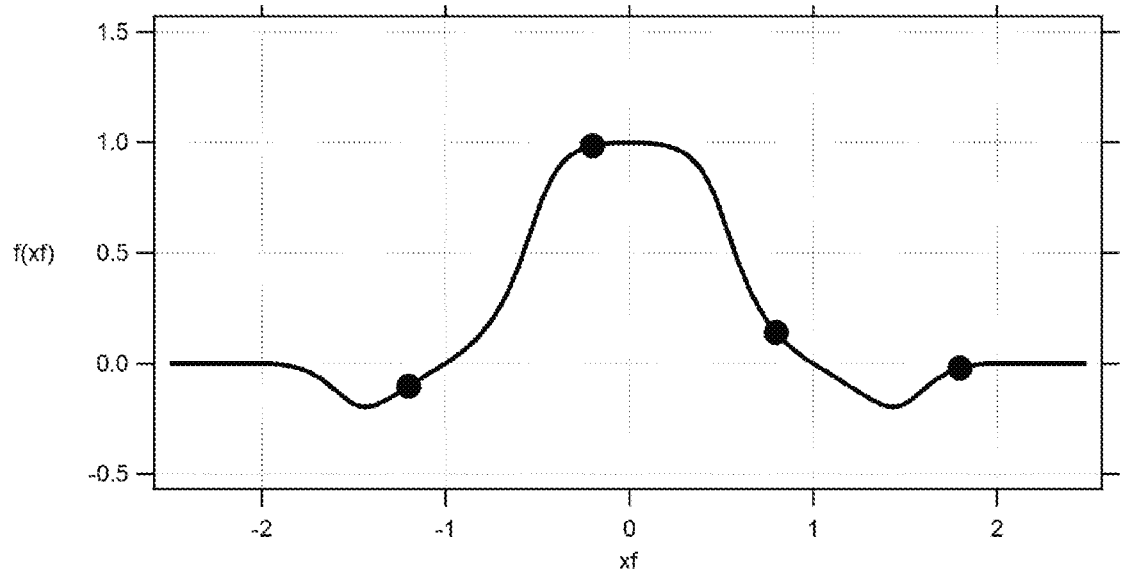
FIG. 15 is a schematic, exemplary view of a synthesis function, which for a relative pixel size of w equal to 1×1 fulfills all four conditions.

FIG. 15 shows schematically and exemplarily a synthesis function, which for a relative pixel size of w equal to 1×1 fulfills all four conditions. It was calculated as follows: First, a synthesis function for a cubic or bicubic interpolation for a gain g equal to 1 was selected. Since this synthesis function already fulfills the third and the fourth condition, no correction was performed in this regard. As a correction function for E1(xf), a function according to FIG. 13 was selected. Then, a center of gravity correction, which consists of the function K2(xf) according to FIG. 11 multiplied by a mixing factor MF2(xf)=-u2(xf)/v2(xf), was added to the correction function. Here, u2(xf) is the torsional moment of the filter coefficients of the function E1(xf) and v2(xf) is the torsional moment of the filter coefficients of the function K2(xf). Thereby, the function E2(xf) was obtained. Finally, the relative pixel size w was selected to be equal to 1×1 and, accordingly, the noise gain R was selected to be equal to 1, and the mixing factor M(xf) was determined for all intermediate positions x with the above-mentioned formula for the quadratic equation, whereby the synthesis function F3(xf)=F1(xf)+M(xf)*E2(xf) was obtained.

From this synthesis function, the associated filter coefficients of the respective local filter can be determined for each intermediate position x. With the help of these filter coefficients, an interpolation can be performed such that the transmission of the noise not only occurs in a spatially homogeneous manner, but that also the gain value for the transmission of the noise corresponds to the desired area of the output pixels (second pixels).

Figure 16:
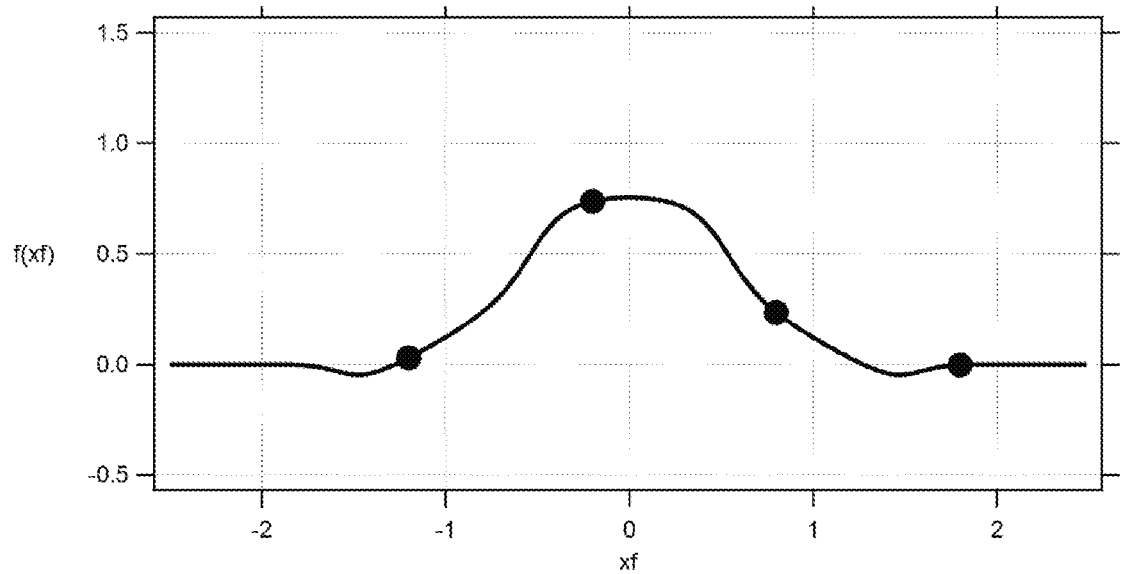
FIG. 16 is a schematic, exemplary view of an alternative synthesis function, which for a relative pixel size of w equal to ⅗×⅗ fulfills all four conditions.

An alternative synthesis function, which for a relative pixel size of w equal to ⅝×⅝ fulfills all four conditions, is schematically and exemplarily shown in FIG. 16. It was calculated from the same functions as in the above-described example. Only the relative pixel size w of the output pixels was changed to ⅝×⅝, i.e., the area of the virtual second pixels was enlarged by a factor w equal to 2.78 compared to the area of a respective first pixel. With the help of the filter coefficients obtained from this synthesis function, an image can thus be filtered such that the relative pixel size is ⅝×⅝ and, therewith, an enlargement of the pixels occurs both in the width and in the height. Also in this case, the transmission of the noise occurs in a spatially homogeneous manner, wherein the gain value for the transmission of the noise again corresponds to the desired size of the output pixels (virtual second pixels).

Figure 17:
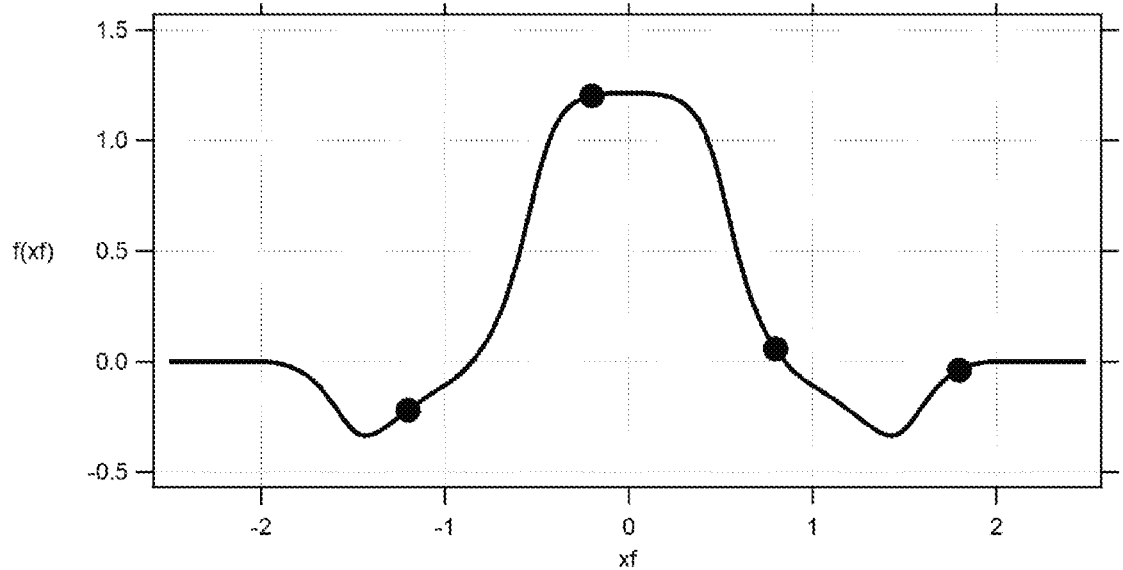
FIG. 17 is a schematic, exemplary view of a further alternative synthesis function, which for a relative pixel size of w equal to ⅔×⅔ fulfills all four conditions.

A further alternative synthesis function, which for a relative pixel size of w equal to ⅔×⅔ fulfills all four conditions, is schematically and exemplarily shown in FIG. 17. It was calculated from the same functions as in the above-described examples. In this case, the relative pixel size w of the output pixels was changed to ⅔×⅔, i.e., the area of the virtual second pixels was reduced by a factor w equal to 2.25 compared to the area of a respective first pixel. With the help of the filter coefficients obtained from this synthesis function, an image can thus be filtered such that the relative pixel size is ⅔×⅔ and, therewith, a reduction of the pixels occurs both in the width and in the height. Also in this case, the transmission of the noise occurs in a spatially homogeneous manner, wherein the gain value for the transmission of the noise again corresponds to the desired size of the output pixels (virtual second pixels).

In order to demonstrate the effect of the inventive filter, an experiment was performed. To do so, a first series of raw images was captured with a customary industry camera with a CCD image sensor of a first pixel size in the manner described in the EMVA standard 1288. For the employed green wavelength of the light, the sensor has a quantum efficiency QE of 53.6%.

From this first series of images with a first resolution, a second series of images with a corresponding second resolution was generated for different desired sizes of the virtual second pixels, respectively, using, on the one hand, a bicubic interpolation and, on the other hand, the inventive interpolation. Here, the ratio of the second resolution to the first resolution in the x and y direction corresponds to the reciprocal of the ratio of the size of the virtual second pixels to the size of the first pixels. The resulting second series of images have been evaluated in the manner described in the EMVA standard 1288 under the assumption of the second pixel size.

Figure 18:
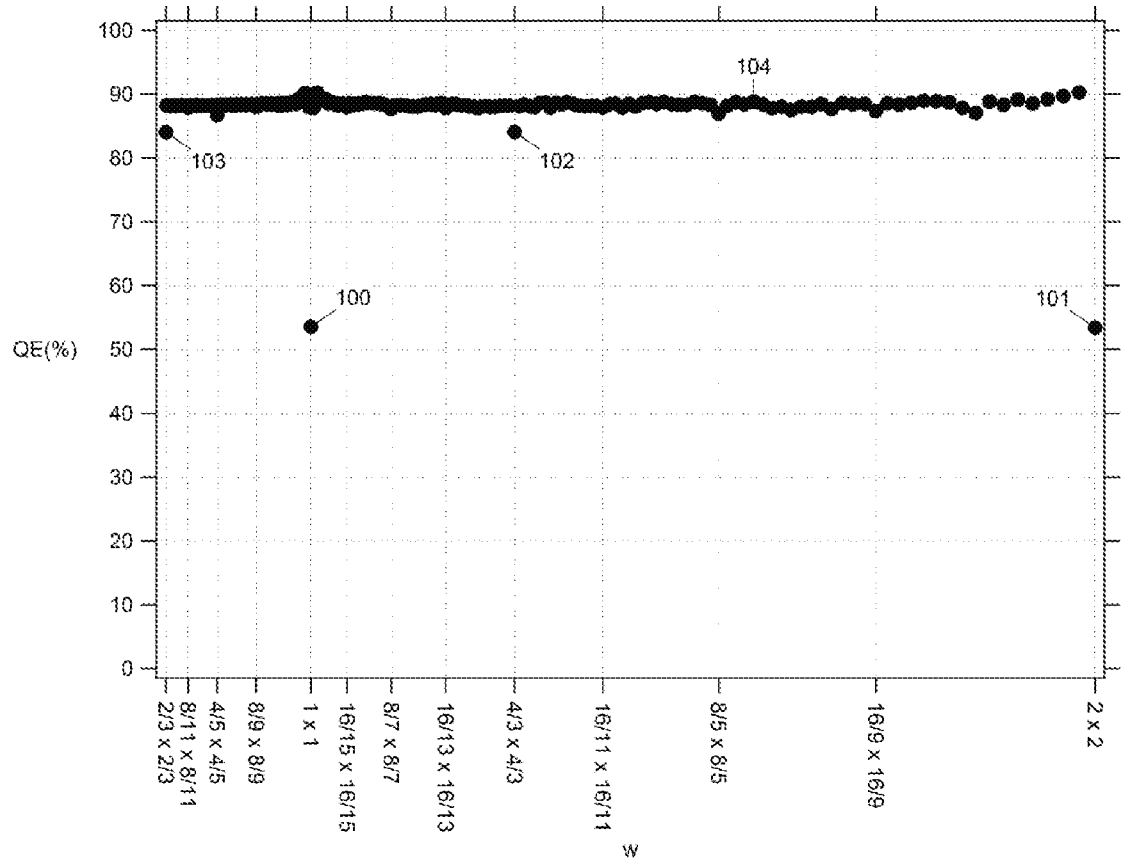
FIG. 18 is a schematic, exemplary view of a quantum efficiency curve in dependence of the selected pixel size w for a bicubic interpolation, determined according to the EMVA standard 1288.

FIG. 18 shows schematically and exemplarily the quantum efficiency values QE in percent obtained for the bicubic interpolation plotted against the relative pixel size w. As can be seen, for a relative pixel size 1×1, which is identical to the size of the first pixels, a correct quantum efficiency value 100 results. Moreover, for a relative pixel size 2×2, which corresponds to an integer multiple of the size of the first pixels, also a correct quantum efficiency value 101 is obtained.

Figure 4:
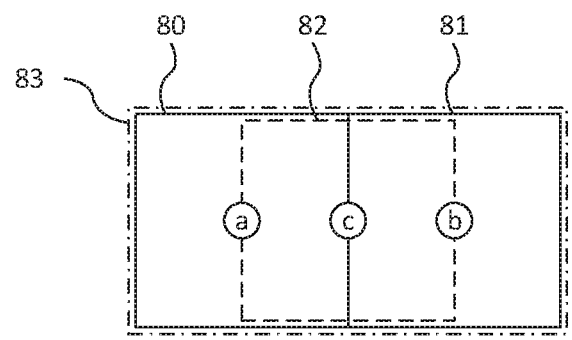
FIG. 4 is a schematic, exemplary view of the effect of a known interpolation on the characteristics of a pixel.

For all values of the relative pixel size w that do not correspond to an integer multiple of the size of the first pixels, the resulting quantum efficiency values are significantly above 80%. These values are not correct. They do not correspond to the quantum efficiency of the digital camera, since, as a material and design dependent physical characteristic of the sensor, these should also stay constant when the size of the pixels is changed. The determined QE values signify that the bicubic interpolation performs an undesired enlargement of the pixel area in a way that resembles what is shown in FIG. 4.

Figure 19:
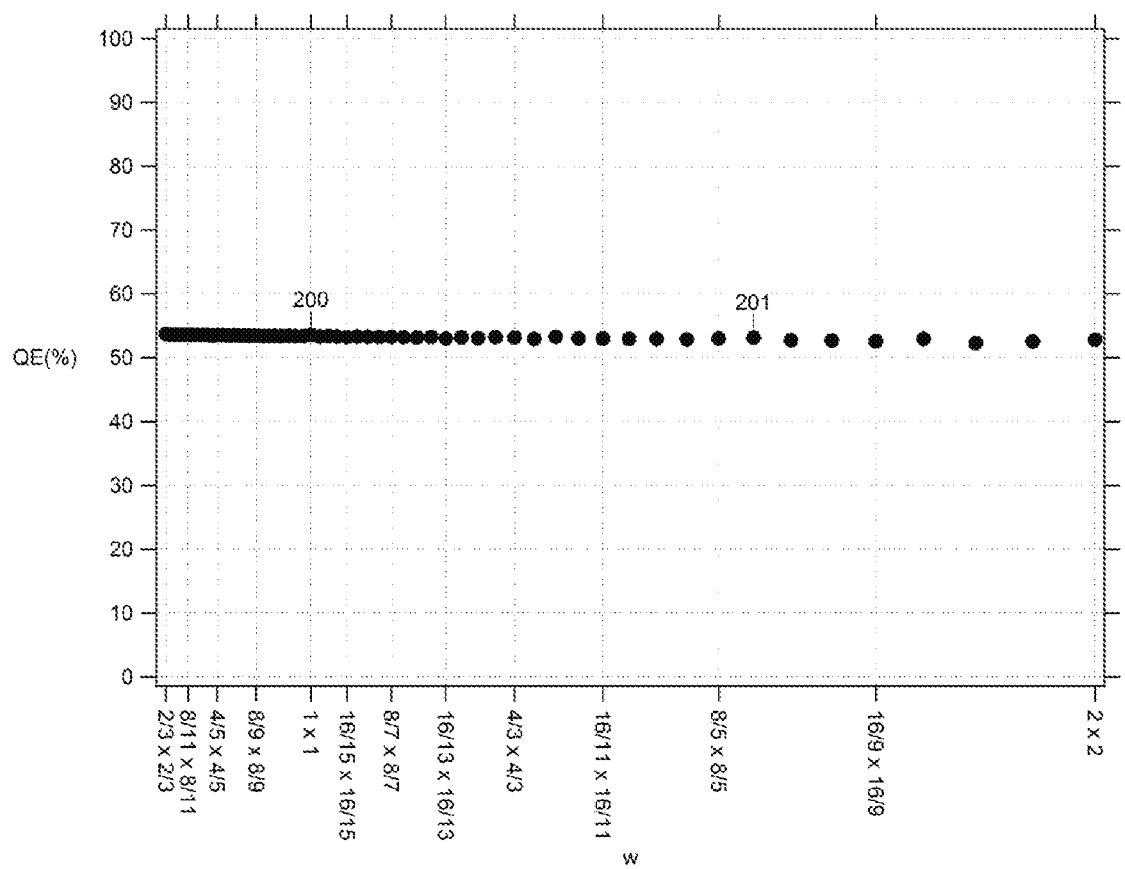
FIG. 19 is a schematic, exemplary view of a quantum efficiency curve in dependence of the selected pixel size w for the inventive interpolation, determined according to the EMVA standard 1288.

FIG. 19 shows schematically and exemplarily the QE values for the inventive interpolation. Not only the quantum efficiency value 200 obtained for the original resolution, but also all other quantum efficiency values 201 substantially correspond to the correct value. This shows that the inventive interpolation correctly performs the change of the pixel size and that important physical characteristics of the pixels are correctly obtained when doing so.

In the above, it was explained how local filters for two or more virtual second pixels (output pixels) of the same size at different intermediate positions between the first pixels (input pixels) can be set such that the image data of an image sensor can be interpolated with their help in such way that a behavior, that is as much as possible physically correct, is obtained for a desired area of the virtual second pixels.

The exemplarily mentioned local filters are substantially described in a one-dimensional way in order to allow for an easy understanding. Of course, the corresponding teaching can also be applied to two-dimensional filters. Alternatively, a two-, three-, or higher-dimensional effect can be obtained by subsequently performing multiple one-dimensional filter processes in an arbitrary order, e.g., first in the x direction, then in the y direction, et cetera.

As a concrete example of a local filter, which fulfills all four conditions, the case may be assumed, where the resolution of the image data of an image sensor shall be reduced by a factor of 5/6 in both the horizontal and vertical direction. Therewith, the size of the virtual second pixels is increased in comparison to the size of the first pixels in both directions by the factor 6/5 equal to 1.2, i.e., the relative pixel size w corresponds to 1.2, respectively, and in total 1.2×1.2 equal to 1.44 (i.e., (6/5)$^2$). The intermediate positions can then be selected in each direction at the following positions between the first pixels: 2; 3.2; 4.4; 5.6; 6.8; 8; 9.2; 10.4; 11.6; 12.8; 14; et cetera. In this example, the series of the intermediate positions does not start with zero but with 2, in order to provide for each virtual pixel a sufficiently large neighborhood for determining the respective brightness value.

Thus, the following five intermediate positions result in the one-dimensional case:

(0,0) (0,2) (0,4) (0,6) (0,8)

For these five intermediate positions, the filter coefficients for a one-dimensional filter with a size equal to four can be selected for a predetermined gain g equal to 1—relative to the gain of the first pixels—as follows:

| | | | | |
|---|---|---|---|---|
| (0,0): | 0.0 | 0.0446582 | 0.910684 | 0.0446582 |
| (0,2): | −0.0146189 | 0.174828 | 0.8942 | −0.0544097 |
| (0,4): | −0.0857036 | 0.435544 | 0.786022 | −0.135683 |
| (0,6): | −0.135863 | 0.786022 | 0.435544 | −0.0857035 |
| (0,8): | −0.0544097 | 0.8942 | 0.174828 | −0.0146189 |

The filter coefficients fulfill for each of the local filters the condition that their sum is equal to the predetermined gain g, i.e., equal to 1 (third condition), that their center of gravity corresponds to the associated intermediate position (fourth condition), and that the sum of their squares is equal to a constant value (first condition), which, here, is 0.833333 equal to 5/6. This value corresponds to the square of the noise gain R, which corresponds to the product of the predetermined gain g of the virtual second pixels relative to the gain of the first pixels (i.e., 1 in this case) and the reciprocal of the square root of the predetermined relative pixel size w (i.e., here, the reciprocal of the square root of 6/5, i.e., the change of the size of the virtual second pixels relative to the first pixels in the respective direction). If the one-dimensional filter is applied in the horizontal and vertical direction, the desired reduction of the resolution by the factor 5/6 in both direction results.

When considering the two-dimensional case, the corresponding 5$^2$=25 two-dimensional intermediate positions are:

| | | | | |
|---|---|---|---|---|
| (0,0\|0,0) | (0,0\|0,2) | (0,0\|0,4) | (0,0\|0,6) | (0,0\|0,8) |
| (0,2\|0,0) | (0,2\|0,2) | (0,2\|0,4) | (0,2\|0,6) | (0,2\|0,8) |
| (0,4\|0,0) | (0,4\|0,2) | (0,4\|0,4) | (0,4\|0,6) | (0,4\|0,8) |
| (0,6\|0,0) | (0,6\|0,2) | (0,6\|0,4) | (0,6\|0,6) | (0,6\|0,8) |
| (0,8\|0,0) | (0,8\|0,2) | (0,8\|0,4) | (0,8\|0,6) | (0,8\|0,8) |

For these 25 intermediate positions, corresponding two-dimensional filters, each with 4$^2$=16 filter coefficients, can be calculated. In the following, the filter coefficients for the intermediate positions (0,0|0,0), (0,4|0,4), and (0,8|0,8) are given as an example:

(0,0|0,0):

| | | | |
|---|---|---|---|
| 0.0 | 0.0 | 0.0 | 0.0 |
| 0.0 | 0.0019944 | 0.04067 | 0.0019944 |
| 0.0 | 0.04067 | 0.82934 | 0.04067 |
| 0.0 | 0.0019944 | 0.04067 | 0.0019944 |

(0,4|0,4):

| | | | |
|---|---|---|---|
| 0.0073451 | −0.037328 | −0.067365 | 0.011644 |
| −0.037328 | 0.1897 | 0.34235 | −0.059174 |
| −0.067365 | 0.34235 | 0.61783 | −0.10679 |
| 0.011644 | −0.059174 | −0.10679 | 0.018459 |

(0,8|0,8):

| | | | |
|---|---|---|---|
| 0.0029604 | −0.048653 | −0.0095123 | 0.00079541 |
| −0.048653 | 0.79959 | 0.15633 | −0.013072 |
| −0.0095123 | 0.15633 | 0.030565 | −0.0025558 |
| 0.00079541 | −0.013072 | −0.0025558 | 0.00021371 |

Also in the two-dimensional case, the filter coefficients for each of the local filters fulfill the condition that their sum is equal to the predetermined gain g, i.e., equal to 1 (third condition), that their center of gravity corresponds to the associated intermediate position (fourth condition), and that the sum of their squares is equal to a constant value (first condition), which, here, is 0.694444 equal to (5/6)$^2$. This value corresponds to the square of the noise gain R, which corresponds to the product of the predetermined gain g of the virtual second pixels relative to the gain of the first pixels (i.e., 1 in this case) and the reciprocal of the square root of the predetermined relative pixel size w (i.e., here, the reciprocal of the square root of (6/5)$^2$, i.e., the total change of the size of the virtual second pixels relative to the first pixels).

The filtering can be performed in a digital camera 10, e.g., in the described calculating apparatus 32. The calculating apparatus 32 can be realized, e.g., as a processor, a micro processing unit (MPU) or a micro control unit (MCU), a digital signal processor (DSP), a field programmable gate array (FPGA), a graphics processing unit (GPU), or as an application specific integrated circuit (ASIC). The calculating apparatus 32 can also be integrated into another module, for example, into the image sensor 31 or into the interface 32. Therewith, it is, e.g., also possible to produce an image sensor 31 with a freely adjustable pixel size or a corresponding interface module 33 for a digital camera.

Since both the synthesis function and the filter coefficients are independent of the current image content, they do not have to be re-set for the calculation of each new second pixel. Rather, they can be set in advance and the filter values can be stored in a storage of the calculating apparatus 32, e.g., in a table. Thus, the mathematical operations that have to be performed during run-time are limited to the readout of the filter coefficients from a table and the application in the form of a linear filtering. This can be realized with the above-mentioned embodiments of the calculating apparatus 32 with only a small amount of computation time or with a small amount of resources.

The calculating apparatus 32 can also comprise an adjusting element for adjusting at least the relative pixel size (and, as the case may be, the gain of the virtual second pixels relative to a gain of the first pixels), wherein the calculating apparatus 32 is configured to set the filter coefficients of the local filters based on the adjusted relative filter size (and, as the case may be, the adjusted gain). As described above, it can advantageously also be foreseen that also the resolution of the output image (virtual second pixels) is adjustable by means of the adjusting element.

Furthermore, the filtering can also be performed after the output as an electronic signal 34, e.g., in a portion of a technical system, in a computer, or in a smartphone.

Further variations of the disclosed embodiments can be understood and performed by a skilled person practicing the claimed invention based on the drawings, the description, and the appended claims.

It will be understood that any described processes or steps within described processes may be combined with other disclosed processes or steps to form structures within the scope of the present disclosure. The exemplary structures and processes disclosed herein are for illustrative purposes and are not to be construed as limiting.

In the claims, the terms "contain" and "comprise" do not exclude further elements or steps and the indefinite article "a" does not exclude a plurality.

A single unit or apparatus can perform the function of multiple elements that are recited in the claims. The fact that individual functions and/or elements are recited in different dependent claims does not mean that a combination of these functions and/or elements could not be used to advantage.

The reference numerals in the claims are not to be understood in the sense that the subject matter and the scope of protection of the claims would be limited by these reference numerals.

In conclusion, an image processing apparatus for processing image data of an image sensor with a regular arrangement of first pixels was described, wherein the image processing apparatus is configured to determine a brightness value for each of two or more virtual second pixels of the same size at different intermediate positions between the first pixels, wherein the determination of the respective brightness value comprises an interpolation of the pixels of a neighborhood of the respective intermediate position, the neighborhood comprising several of the first pixels, by means of an associated local filter, wherein each of the local filters comprises a plurality of filter coefficients, wherein for at least one of the local filters more than one of the filter coefficients is unequal to zero, and wherein the sum of the squared filter coefficients for each of the local filters is equal to a constant value, which according to a first condition is the same for all local filters.

It will be understood by one having ordinary skill in the art that construction of the present disclosure and other components is not limited to any specific material. Other exemplary embodiments of the disclosure disclosed herein may be formed from a wide variety of materials, unless described otherwise herein.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. Image processing apparatus for processing image data of an image sensor with a regular arrangement of first pixels, wherein the image processing apparatus is configured to determine a brightness value for each of two or more virtual second pixels of the same size at different intermediate positions between the first pixels, wherein the determination of the respective brightness value comprises an interpolation of the pixels of a neighborhood of the respective intermediate position, the neighborhood comprising several of the first pixels, by means of an associated local filter, wherein each of the local filters comprises a plurality of filter coefficients, wherein for at least one of the local filters more than one of the filter coefficients is unequal to zero, and wherein the sum of the squared filter coefficients for each of the local filters is equal to a constant value, which according to a first condition is the same for all local filters.

2. The image processing apparatus as defined in claim 1, wherein according to a second condition the constant value corresponds to the square of a noise gain (R), wherein the noise gain (R) corresponds to the product of a predetermined gain (g) of the virtual second pixels relative to a gain of the first pixels and the reciprocal of the square root of a predetermined relative pixel size (w), and wherein the relative pixel size (w) corresponds to the ratio of the size of the virtual second pixels to the size of the first pixels.

3. The image processing apparatus pursuant to claim 1, wherein for each of the local filters the filter coefficients additionally fulfill a third condition that the sum of the filter coefficients is equal to a predetermined gain (g).

4. The image processing apparatus pursuant to claim 3, wherein the image processing apparatus comprises an adjusting element for adjusting at least the relative pixel area (w), wherein the image processing apparatus is configured to set the filter coefficients of the local filters based on the adjusted relative pixel area (w).

5. The image processing apparatus pursuant to claim 4, wherein the setting of the filter coefficients comprises a determination of filter coefficients according to a synthesis function, wherein the determined filter coefficients preferably fulfill the first and the third condition, as well as a correcting of the determined filter coefficients or the synthesis function based on a second and/or a third correction function in such a way that corrected filter coefficients are obtained that additionally fulfill the second condition and/or the fourth condition.

6. The image processing apparatus pursuant to claim 1, wherein for each of the local filters the filter coefficients additionally fulfill a force condition that the center of gravity of the filter coefficients corresponds to the associated intermediate position.

7. The image processing apparatus pursuant to claim 1, wherein for each of the local filters the size of the local filter is selected such that the respective virtual second pixel is completely located within the local filter in the interpolation.

8. The image processing apparatus pursuant to claim 1, wherein the interpolation is a two-dimensional interpolation, and wherein each of the local filters is a two-dimensional local filter by means of which the two-dimensional interpolation is performed, or wherein each of the local filters corresponds to the dyadic product of two one-dimensional local filters by means of which the two-dimensional interpolation is performed as two subsequently performed one-dimensional interpolations.

9. The image processing apparatus pursuant to claim 8, wherein the two-dimensional filter has an even-numbered size in each of the two dimensions, or wherein the two one-dimensional local filters have an even-numbered size in the respective one dimension.

10. The image processing apparatus pursuant to claim 9, wherein the relative side length of the virtual second pixels, which corresponds to the ratio of the length of one side of the virtual second pixels to the length of a corresponding side of the first pixels, is smaller or equal to 2, and wherein for each of the local filters the size of the local filter in a dimension in the direction parallel to the side is equal to 4.

11. The image processing apparatus pursuant to claim 10, wherein the image processing apparatus comprises a storage in which the filter coefficients of the local filters are stored for use in the interpolation.

12. A digital camera, comprising:
an image sensor with a regular arrangement of first pixels for generating image data; and
an image processing apparatus for processing the image data of the image sensor, wherein the image processing apparatus is configured to determine a brightness value for each of two or more virtual second pixels of the same size at different intermediate positions between the first pixels, wherein the determination of the respective brightness value comprises an interpolation of the pixels of a neighborhood of the respective intermediate position, the neighborhood comprising several of the first pixels, by means of an associated local filter, wherein each of the local filters comprises a plurality of filter coefficients, wherein for at least one of the local filters more than one of the filter coefficients is unequal to zero, and wherein the sum of the squared filter coefficients for each of the local filters is equal to a constant value, which according to a first condition is the same for all local filters.

13. An image processing method for processing image data of an image sensor with a regular arrangement of first pixels, wherein the image processing method determines a brightness value for each of two or more virtual second pixels of the same size at different intermediate positions between the first pixels, wherein the determination of the respective brightness value comprises an interpolation of the pixels of a neighborhood of the respective intermediate position, the neighborhood comprising several of the first pixels, by means of an associated local filter, wherein each of the local filters comprises a plurality of filter coefficients, wherein for at least one of the local filters more than one of the filter coefficients is unequal to zero, and wherein the sum of the squared filter coefficients for each of the local filters is equal to a constant value, which according to a first condition is the same for all local filters.

14. A computer apparatus comprising a processing unit that is configured to perform the image processing method as defined in claim 13.

15. A computer program product comprising coding for causing a computer apparatus to perform the image processing method as defined in claim 13, when the computer program product is executed on the computer apparatus.

* * * * *

UNITED STATES PATENT AND TRADEMARK OFFICE
CERTIFICATE OF CORRECTION

PATENT NO. : 10,521,882 B2
APPLICATION NO. : 15/737785
DATED : December 31, 2019
INVENTOR(S) : Kunze It is certified that error appears in the above-identified patent and that said Letters Patent is hereby corrected as shown below:

In the Specification

Column 2, Line 51, "sides" should be --side--;

Column 3, Line 3, "techniques" should be --techniques,--;

Column 4, Line 47, "twice as large" should be --twice-as-large--;

Column 5, Line 27, "exemplarity" should be --exemplarily--;

Column 5, Line 54, "interfere" should be --interferes--;

Column 8, Line 24, after "filters" insert --is--;

Column 9, Line 29, "comprise." should be --comprise,--;

Column 10, Line 42, "claim 14" should be --claim 13--;

Column 10, Lines 46-47, "claim 14" should be --claim 13--;

Column 10, Line 50, "claim 13" should be --claim 12--;

Column 10, Line 51, "claim 14" should be --claim 13-- and "claim 15" should be --claim 14--;

Column 10, Line 53, "claim 16" should be --claim 15--;

Column 10, Line 61, "embodiment" should be --embodiments--;

Column 11, Line 18, "sign" should be --sine--;

Signed and Sealed this
Fourth Day of August, 2020

Andrei Iancu
*Director of the United States Patent and Trademark Office*

CERTIFICATE OF CORRECTION (continued)
U.S. Pat. No. 10,521,882 B2

Column 11, Line 29, "cos(w*xf)" should be --cos(ω*xf)--;

Column 13, Line 2, "filters" should be --filter--;

Column 16, Line 34, "value" should be --values--;

Column 17, Line 6, "sign" should be --sine--;

Column 19, Lines 24-32,

| | | | |
|---|---|---|---|
| "0.0 | 0.0446582 | 0.910684 | 0.0446582" should be |
| --0,0 | 0,0446582 | 0,910684 | 0,0446582-- |
| "-0.0146189 | 0.174828 | 0.8942 | -0.0544097" should be |
| --0,0146189 | 0,174828 | 0,8942 | 0,0544097-- |
| "-0.0857036 | 0.435544 | 0.786022 | -0.135683" should be |
| --0,0857036 | 0,435544 | 0,786022 | -0,135683-- |
| "-0.135863 | 0.786022 | 0.435544 | -0.0857035" should be |
| -- -0,135863 | 0,7860222 | 0,435544 | -0,0857035-- |
| "-0.0544097 | 0.8942 | 0.174828 | -0.0146189" should be |
| -- -0,0544097 | 0,8942 | 0,174828 | -0,0146189--; |

Column 19, Line 49, "direction" should be --directions--;

Column 20, Lines 4-7, 10-13, 17-20,

| | | | |
|---|---|---|---|
| "0.0 | 0.0 | 0.0 | 0.0" should be |
| --0,0 | 0,0 | 0,0 | 0,0-- |
| "0.0 | 0.0019944 | 0.04067 | 0.0019944" should be |
| --0,0 | 0,0019944 | 0,04067 | 0,0019944-- |
| "0.0 | 0.04067 | 0.82934 | 0.04067" should be |
| --0,0 | 0,04067 | 0,82934 | 0,04067-- |
| "0.0 | 0.0019944 | 0.04067 | 0.0019944" should be |
| --0,0 | 0,0019944 | 0,04067 | 0,0019944-- |
| "0.0073451 | -0.037328 | -0.067365 | 0.011644" should be |
| --0,0073451 | -0,037328 | -0,067365 | 0,011644-- |
| "-0.037328 | 0.1897 | 0.34235 | -0.059174" should be |
| --0,037328 | 0,1897 | 0,34235 | -0,059174-- |
| "-0.067365 | 0.34235 | 0.61783 | -0.10679" should be |
| -- -0,067365 | 0,34235 | 0,61783 | -0,10679-- |
| "0.011644 | -0.059174 | -0.10679 | 0.018459" should be |
| --0,011644 | -0,059174 | -0,10679 | 0,018459--; |

Column 20, Lines 17-20,

| | | | |
|---|---|---|---|
| "0.0029604 | -0.048653 | -0.0095123 | 0.00079541" should be |
| --0,0029604 | -0,048653 | -0,0095123 | 0,00079541-- |
| "-0.048653 | 0.79959 | 0.15633 | -0.013072" should be |
| -- -0,048653 | 0,79959 | 0,15633 | -0,013072-- |
| "-0.0095123 | 0.15633 | 0.030565 | -0.0025558" should be |

-- -0,0095123   0,15633       0,030565      -0,0025558--
"0.00079541   -0.013072    -0.0025558    0.00021371" should be
--0,00079541  -0.013072    -0.0025558    0.00021371--; and Column 22, Line 3, "connector" should be --connectors--.